United States Patent
Ikenaka

(10) Patent No.: US 7,426,170 B2
(45) Date of Patent: Sep. 16, 2008

(54) OBJECTIVE LENS AND OPTICAL PICKUP APPARATUS FOR REPRODUCING AND/OR RECORDING INFORMATION FOR AT LEAST TWO TYPES OF OPTICAL DISCS

(75) Inventor: Kiyono Ikenaka, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/604,804

(22) Filed: Nov. 28, 2006

(65) Prior Publication Data

US 2007/0070861 A1  Mar. 29, 2007

Related U.S. Application Data

(63) Continuation-in-part of application No. 11/109,735, filed on Apr. 20, 2005, and a continuation-in-part of application No. 10/647,456, filed on Aug. 26, 2003, now Pat. No. 7,200,079.

(30) Foreign Application Priority Data

| Aug. 30, 2002 | (JP) | ............................. 2002-252986 |
| Sep. 30, 2002 | (JP) | ............................. 2002-285515 |
| Apr. 27, 2004 | (JP) | ............................. 2004-131349 |

(51) Int. Cl.
  *G11B 7/135* (2006.01)
  *G11B 7/00* (2006.01)

(52) U.S. Cl. .............................................. 369/112.08
(58) Field of Classification Search .................. None
  See application file for complete search history.

(56) References Cited

U.S. PATENT DOCUMENTS

| 7,206,276 B2 * | 4/2007 | Kimura et al. ......... 369/112.08 |
| 2001/0008513 A1 * | 7/2001 | Arai et al. .............. 369/112.08 |
| 2002/0159377 A1 | 10/2002 | Saito et al. |
| 2002/0181366 A1 * | 12/2002 | Katayama ................... 369/53.2 |
| 2003/0058776 A1 | 3/2003 | Sakamoto |
| 2004/0190417 A1 * | 9/2004 | Watanabe et al. ........ 369/53.11 |
| 2004/0257958 A1 * | 12/2004 | Kimura et al. ......... 369/112.03 |
| 2005/0025028 A1 * | 2/2005 | Hirai et al. .............. 369/112.05 |
| 2005/0105447 A1 * | 5/2005 | Ikenaka et al. ......... 369/112.06 |
| 2005/0157624 A1 * | 7/2005 | Koreeda et al. ........ 369/112.05 |
| 2005/0281169 A1 | 12/2005 | Kimura et al. |
| 2006/0039266 A1 | 2/2006 | Kimura et al. |
| 2007/0070861 A1 * | 3/2007 | Ikenaka ................. 369/112.08 |

* cited by examiner

*Primary Examiner*—Joseph Feild
*Assistant Examiner*—Peter Vincent Agustin
(74) *Attorney, Agent, or Firm*—Finnegan, Henderson, Farabow, Garrett & Dunner, L.L.P.

(57) ABSTRACT

An objective lens according to the present invention is provided for use in an optical pickup apparatus at least reproducing and/or recording information using a light flux with a wavelength λ1 emitted by a first light source for a first optical disc and reproducing and/or recording information using a light flux with a wavelength λ2 emitted by a second light source for a second optical disc. The objective lens includes a diffractive structure formed on the at least one optical surface of the objective lens. The light fluxes with the wavelengths λ1 and λ2 enter the objective lens, an optical system magnifications m1 and m2 of the objective lens respectively for the light fluxes with wavelengths λ1 and λ2 have different signs and values from each other, and the diffractive structure has a positive diffractive action.

29 Claims, 6 Drawing Sheets

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OBJECTIVE LENS AND OPTICAL PICKUP APPARATUS FOR REPRODUCING AND/OR RECORDING INFORMATION FOR AT LEAST TWO TYPES OF OPTICAL DISCS

This application is a continuation-in-part application of U.S. patent application Ser. No. 10/647,456, filed on Aug. 26, 2003, now U.S. Pat. No. 7,200,079 and U.S. patent application Ser. No. 11/109,735, is a cip filed Apr. 20, 2005, the entirety of both of which are incorporated herein by reference. Applicants also claim priority to Japanese Patent Application Nos. 2002-252986, filed Aug. 30, 2002, 2002-285515, filed Sep. 30, 2002: and 2004-131349, filed Apr. 27, 2004.

BACKGROUND OF THE INVENTION

The present invention relates to an objective lens and an optical pickup apparatus.

In recent years, a trend toward a short wavelength of a laser light source used as a light source for reproducing information recorded on an optical disc or for recording information on an optical disc has been advanced, in an optical pickup apparatus, and there have been put to practical use laser light sources with a wavelength of 405 nm such as, for example, a violet semiconductor laser and a violet SHG laser wherein generation of the second harmonic is used for wavelength conversion of an infra-red semiconductor laser.

If these violet laser light sources are used, information in 15-20 GB can be recorded for an optical disc having a diameter of 12 cm, when using an objective lens with a numerical aperture (NA) identical to that of a digital versatile disc (which will be abbreviated as DVD, hereafter), and when NA of an objective lens is enhanced to 0.85, information in 23-27 GB can be recorded for an optical disc having a diameter of 12 cm. Hereafter, optical discs and magneto-optical discs which use a violet laser light source are generically called "a high density optical disc".

Incidentally, two standards are presently proposed for high density optical discs. One of them is a Blu-ray disc (which will be abbreviated as BD, hereafter) which employs an objective lens with NA 0.85 and has a protective layer whose thickness is 0.1 mm, and the other is HD DVD (which will be abbreviated as HD, hereafter) which employs an objective lens with NA 0.65-0.67 and has a protective layer whose thickness is 0.6 mm. When considering a possibility that these high density optical discs in the two standards appear on the market, a compatible optical pickup apparatus that can conduct recording and reproducing for both of the aforementioned high density optical discs as well as for the conventional DVD and CD is important, and it is especially preferable that compatibility is attained by an objective lens. The expression "compatibility is attained by an objective lens" in this case means that, when rays of light which are different each other in terms of only a wavelength enter the objective lens at the same angle, each ray of light can be converged on a recording surface of the optical disc corresponding to each wavelength.

On the other hand, in the optical pickup apparatus, it is required that the optical pickup apparatus operates safely, even when an individual difference of a laser to be incorporated causes the dispersion of an oscillation wavelength (wavelength characteristics), or even when instantaneous wavelength changes (chromatic aberration) representing the so-called mode-hop or gentle wavelength changes (temperature characteristics) originating from a rise in ambient temperature are caused during operations. For the purpose above mentioned, it is necessary that there is no deterioration of wavefront aberration of the objective lens for the changes in ambient conditions.

A conventional DVD-CD compatible lens is a diffractive lens wherein compatibility is attained by using diffraction actions even for a light source having a wavelength difference such as that between 655 nm and 785 nm, and aberration deterioration is controlled for environmental characteristics which are accompanied by wavelength changes, such as chromatic aberration, wavelength characteristics and temperature characteristics. However, if this technology is applied on compatibility for high density discs and conventional discs, the following problem takes place. The problems is that there is no solution which satisfies both of compatibility and ambient characteristics even when designing with one parameter of wavelength-dependence of diffraction, for the lens compatible for high density discs and conventional discs, while, the wavelength-dependence of the diffraction determined to attain compatibility just satisfies ambient characteristics, in the DVD-CD compatible lens.

In the invention described in TOKKAI No. 2002-298422, there is known the technology to use an objective optical system on which a diffractive structure is provided, and to attain compatibility under an optical system magnification that is zero, in each of HD and DVD.

In the invention described in TOKKAI No. 2002-298422, there arises a problem wherein wavelength characteristics caused by diffraction grow greater, although coma caused by lens shift in the case of tracking is not generated in this method, and wavefront aberration is deteriorated when an oscillation wavelength in a certain lot of lasers is different from that in another lot.

SUMMARY OF THE INVENTION

An object of the invention is backed by consideration of the problems mentioned above, and is to provide an objective lens that is used for reproducing and/or recording of information for at least two types of optical discs including high density discs, and has excellent wavelength characteristics, temperature characteristics and tracking characteristics and to provide an optical pickup apparatus employing this objective lens.

To solve objects stated above, the objective lens relating to the invention is provided with a diffractive structure and has a construction in which signs and values of optical system magnifications corresponding respectively to two types of optical discs are different from each other and, preferably, at least one optical system magnification is not zero for providing another design flexibility. By attaining compatibility for high density optical discs and conventional optical discs by using the diffractive structure and sighs and values of optical system magnifications each being different corresponding to each optical disc, wavelength-dependence of diffraction suitable for correcting ambient characteristics can be obtained. When the optical system magnification is not zero, a ray of light entering the objective lens makes an angle with an optical axis, to cause a problem to generate coma when tracking the objective lens, but it is possible to control an amount of aberration for coma by setting the optical system magnification which is so gentle as to be close to zero, which is preferable.

In the present specification, an optical disc having a protective layer with a thickness from several nanometers to several tens of nanometers on an information recording surface and an optical disc having a protective layer or a protective film whose thickness is zero are also assumed to be included in high density optical discs, in addition to BD and HD mentioned above.

In the present specification, DVD is a general term for optical discs of DVD series such as DVD-ROM, DVD-Video, DVD-Audio, DVD-RAM, DVD-R, DVD-RW, DVD+R and DVD+RW, and CD is a general term for optical discs of CD series such as CD-ROM, CD-Audio, CD-Video, CD-R and CD-RW.

BRIEF DESCRIPTION OF THE DRAWINGS

Each of FIGS. 1(a) and 1(b) is a diagram showing a phase structure.

Each of FIGS. 2(a) and 2(b) is a diagram showing a phase structure.

Figure 3:
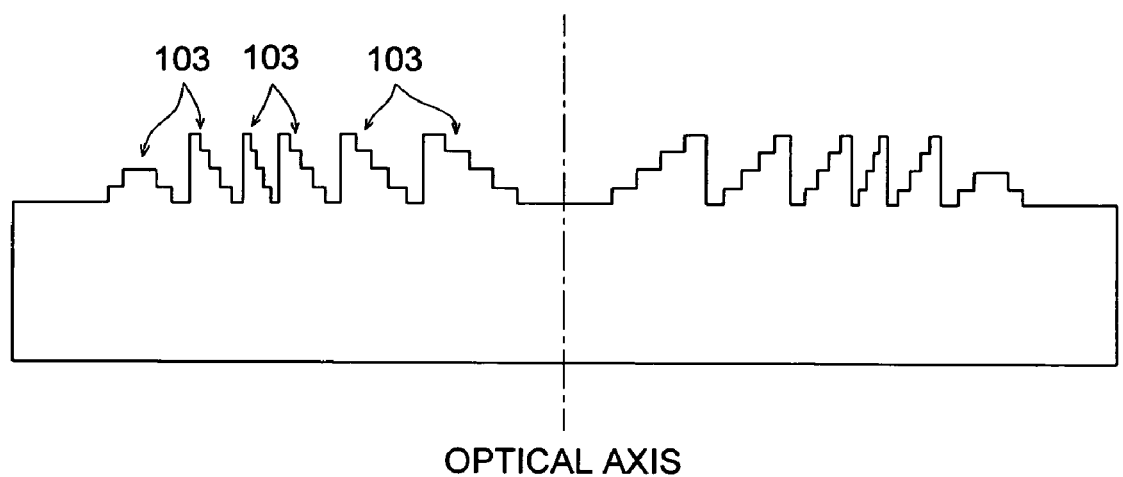
Figure 3:
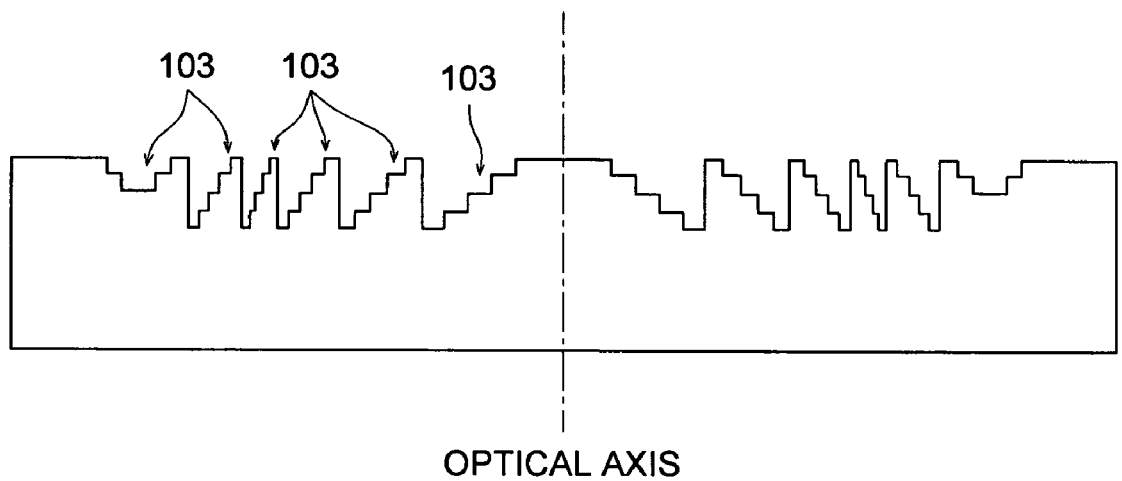

Each of FIGS. 3(a) and 3(b) is a diagram showing a phase structure.

Figure 4:
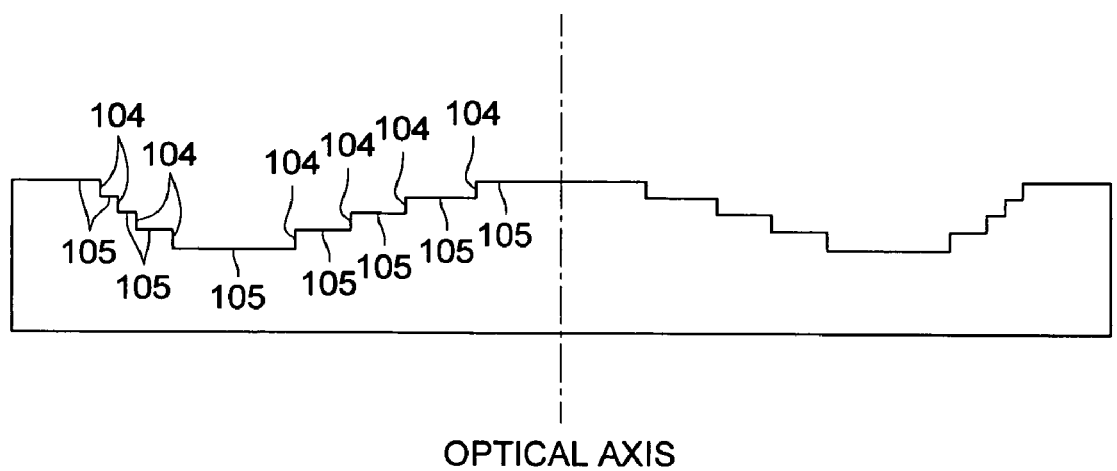
Figure 4:
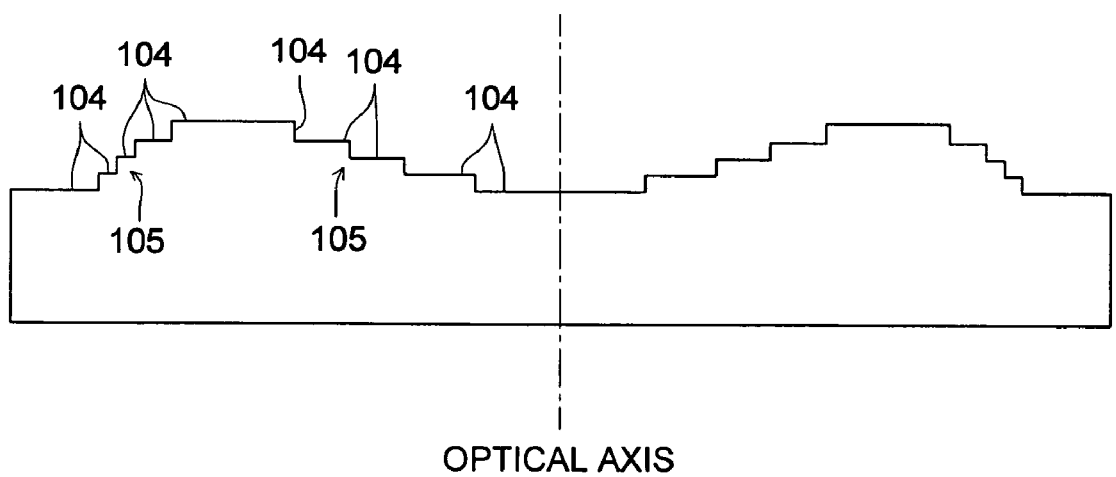

Each of FIGS. 4(a) and 4(b) is a diagram showing a phase structure.

Figure 5:
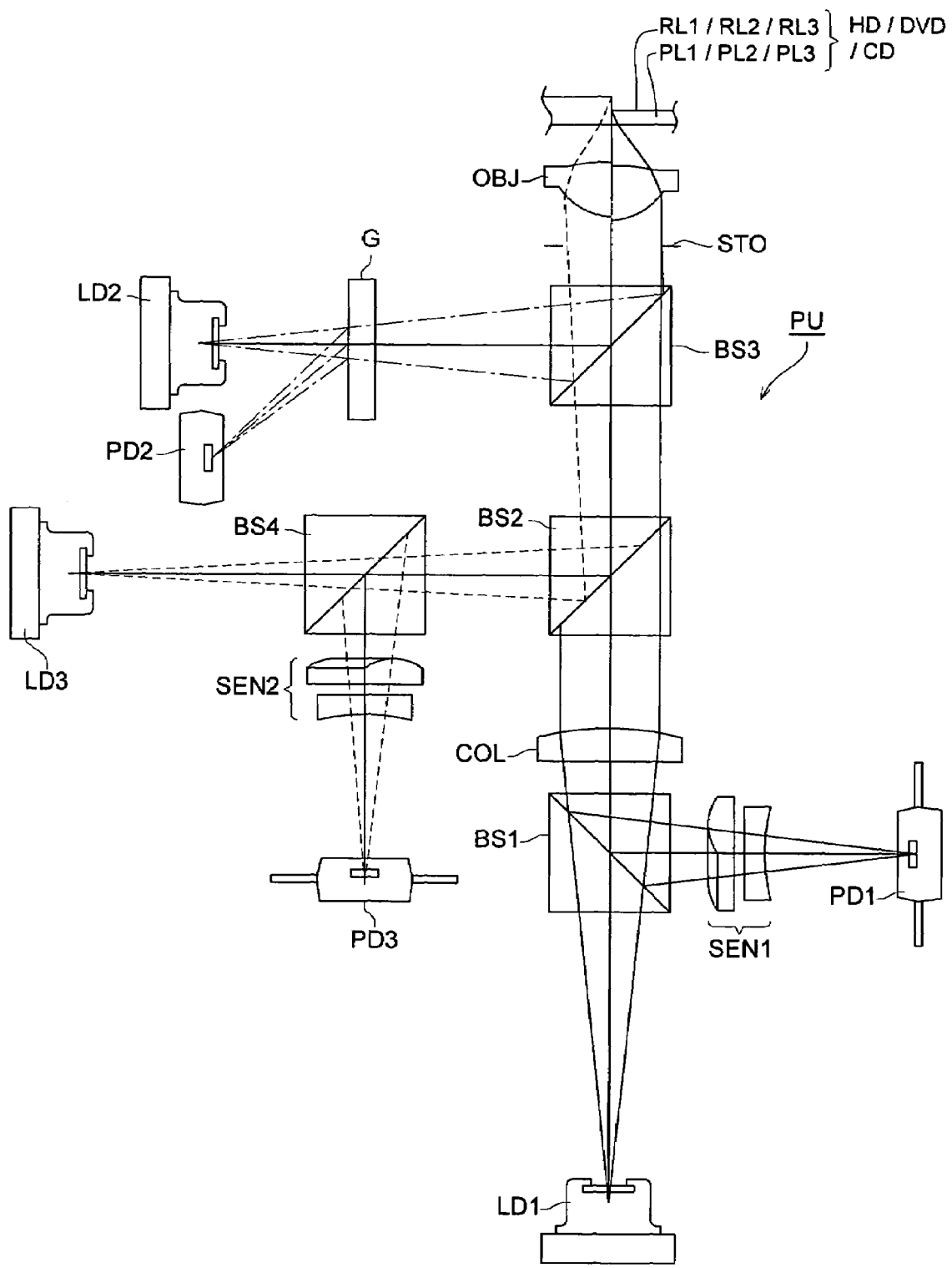

FIG. 5 is a top view of primary parts showing a construction of an optical pickup apparatus.

Figure 6:
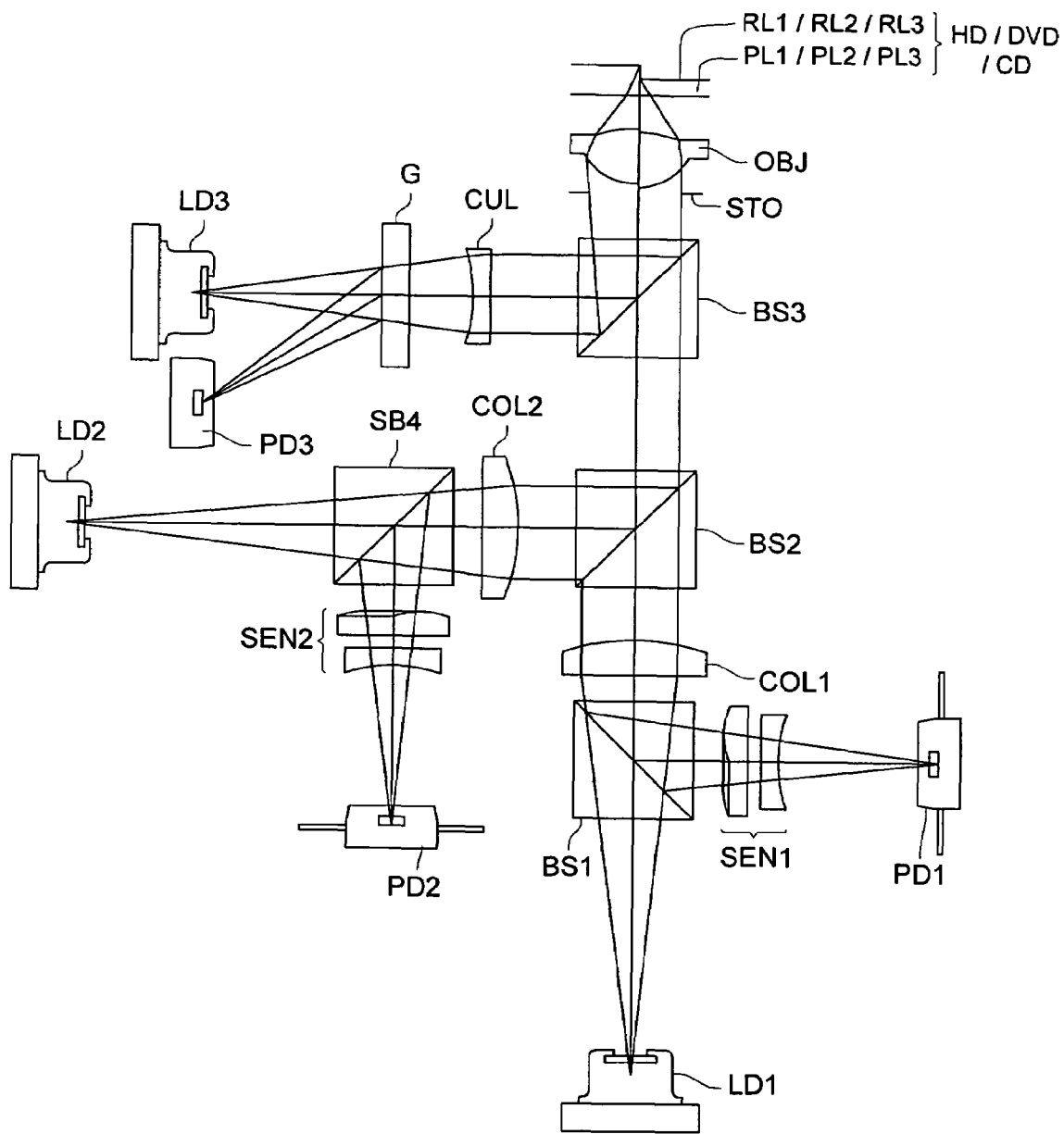

FIG. 6 is a top view of primary parts showing a construction of an optical pickup apparatus.

DETAILED DESCRIPTION OF THE PREFERRED EMBODIMENT

A preferred embodiment of the invention will be explained as follows.

To solve the subjects stated above, a structure described in Item 1 is represented by an objective lens for an optical pickup apparatus at least reproducing and/or recording information by using a light flux with wavelength $\lambda 1$ emitted from a first light source for a first optical disc having protective substrate with a thickness t1 and reproducing and/or recording information by using a light flux with wavelength $\lambda 2$ ($1.5\times \lambda 1 \leq \lambda 2 \leq 1.7\times \lambda 1$) emitted from a second light source for a second optical disc having a protective substrate with a thickness t2 ($0.8\times t1 \leq t2$), wherein light fluxes having respectively the wavelength $\lambda 1$ and wavelength $\lambda 2$ enter the objective lens, the objective lens is provided with a diffractive structure formed on at least one optical surface of the objective lens, optical system magnification m1 of the objective lens for the light flux with-wavelength $\lambda 1$ and optical system magnification m2 of the objective lens for light with wavelength $\lambda 2$ have different signs and values from each other, and the diffractive structure has a positive diffractive action.

The diffractive structure formed on the optical surface of the objective lens is a structure to correct spherical aberration caused by a thickness difference between the protective layer of the first optical disc and that of the second optical disc, and/or wavefront aberration caused by changes of a refractive index of the objective lens originating from changes in ambient temperature and by changes in oscillation wavelength.

Figure 1:
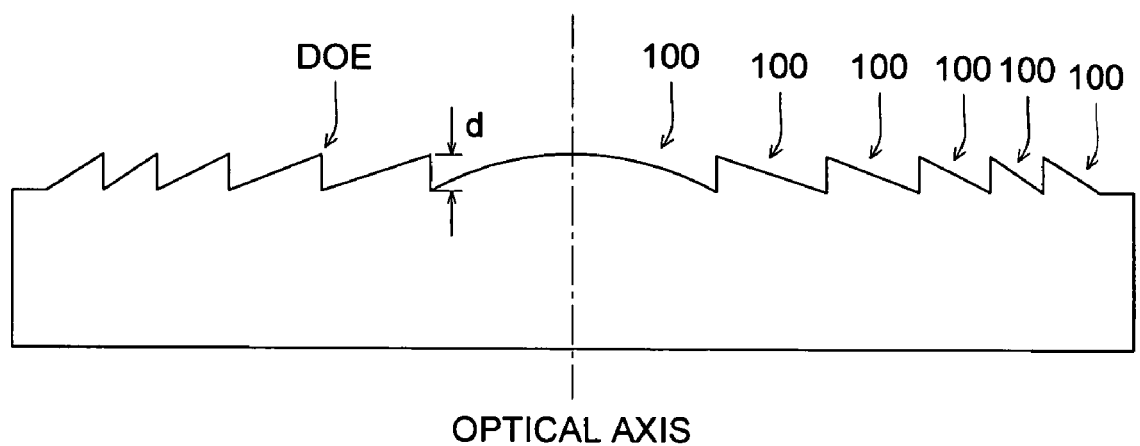
Figure 1:
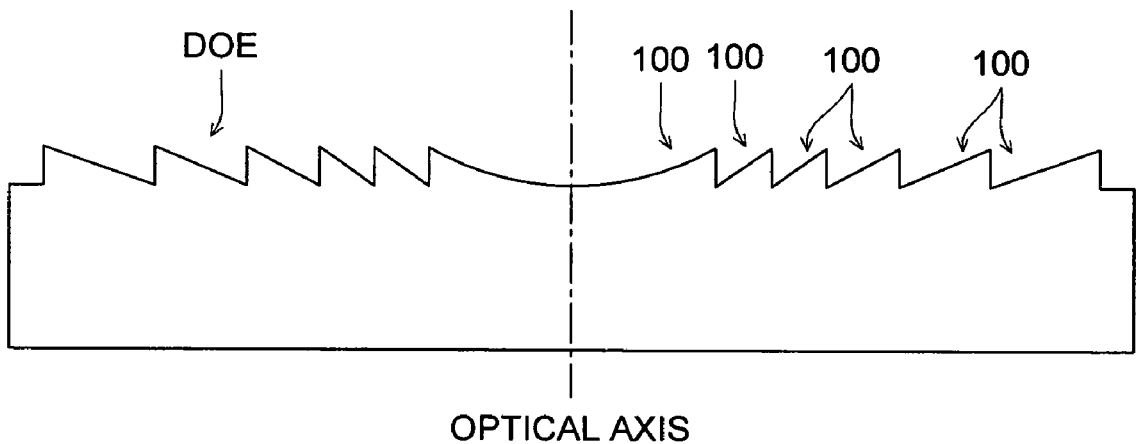
Figure 2:
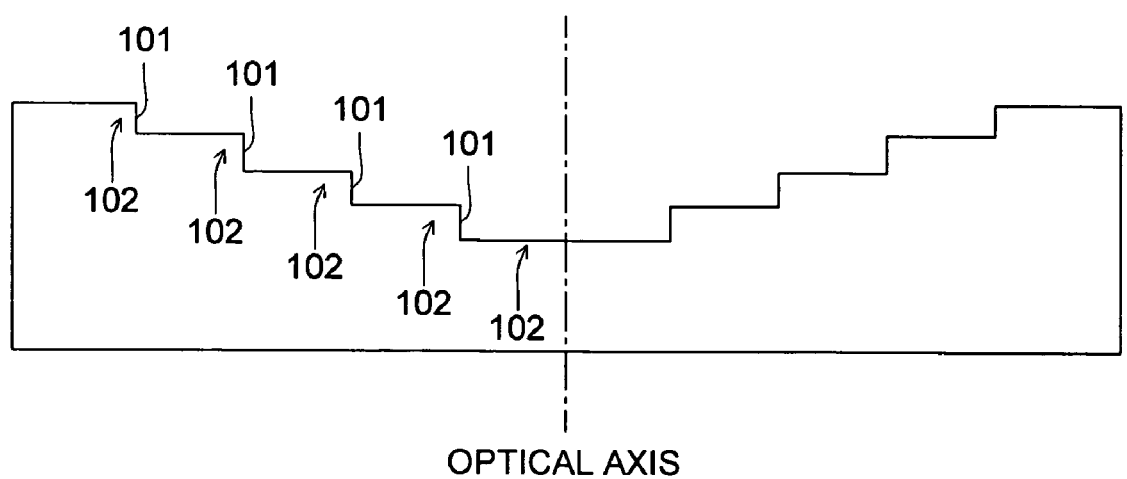
Figure 2:
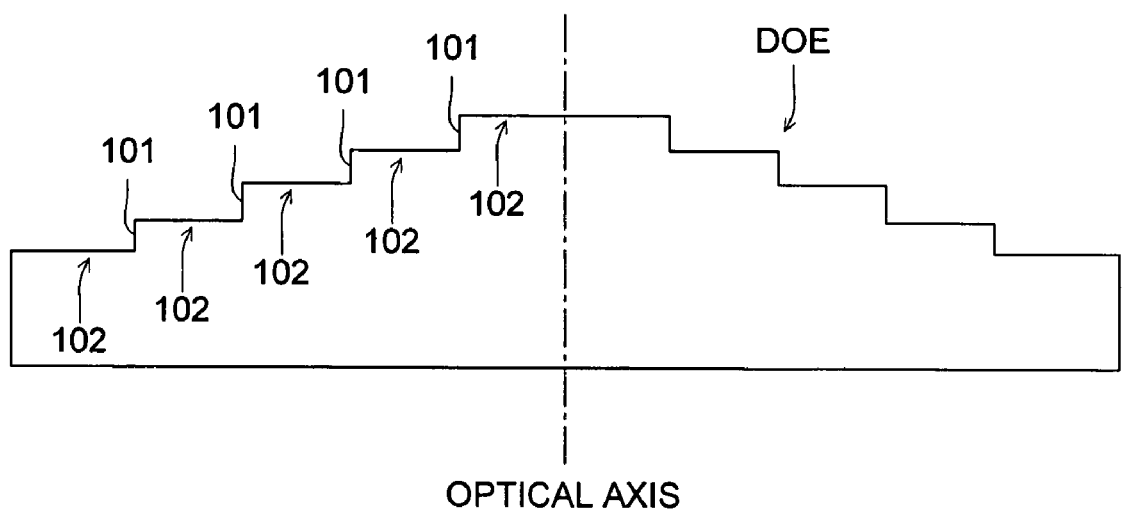

The diffractive structure mentioned above includes a structure which includes plural ring-shaped zones 100 and its sectional form including an optical axis is in a serrated form, as shown schematically in FIGS. 1(a) and 1(b), a structure which includes plural ring-shaped zones 102 in which the directions of steps 101 are the same within an effective diameter, and its sectional view including an optical axis is in a form of stairways as shown schematically in FIGS. 2(a) and 2(b), a structure which includes plural ring-shaped zones 103 in which a staircase structure is formed as shown schematically in FIGS. 3(a) and 3(b), and a structure which includes plural ring-shaped zones 105 in which the directions of steps 104 change by turns on the half way of an effective diameter, as shown schematically in FIGS. 4(a) and 4(b). Incidentally, in the present specification, the diffractive structures each including plural ring-shaped zones as shown in FIGS. 1(a) and 1(b), FIGS. 2(a) and 2(b) and FIGS. 4(a) and 4(b) are assumed to be expressed by a mark "DOE", and the diffractive structure including plural ring-shaped zones in which a staircase structure is formed as shown in FIGS. 3(a) and 3(b) is assumed to be expressed by a mark "HOE".

Incidentally, "the positive diffractive action" means, for example, a diffractive action to be given when the third order spherical aberration is generated in the direction toward the under corrected level for the passing light flux to cancel third order spherical aberration generated by in the direction toward the over corrected level by the elongated wavelength.

By forming a diffractive structure having the positive diffractive action on the optical surface of the objective lens, as in the structure described in Item 1, it is possible to cancel the spherical aberration caused by the diffractive action in the case of temperature changes, with the diffractive action by changes of an oscillation wavelength of the laser (light source). By setting optical system magnification m1 of the objective lens for a light flux with wavelength $\lambda 1$ and optical system magnification m2 of the objective lens for light with wavelength $\lambda 2$ so that their signs and numerical values may be different each other, compatibility for the first optical disc and the second optical disc is shared by the diffractive action and magnification changes, thus, the wavelength-dependence of the diffractive action does not become too great, and there is no problem for operations even when a wavelength only changes as in the case where an oscillation wavelength in a certain lot of lasers is different from that in another lot. Further, the coma originating from tracking of the objective lens becomes an optical system magnification at the level capable of conducting recording and reproducing.

A structure described in Item 2 is the objective lens described in Item 1, wherein the diffractive structure is defined by the following expression by the use of optical path difference function $\phi(h)$;

$$\phi(h) = C_2 \times h^2 + C_4 \times h^4 + \ldots + C_{2i} \times h^{2i}$$

and satisfies $C_4 < 0$, where h represents a height from an optical axis, $C_{2i}$ represents a coefficient of the optical path difference function and i represents a natural number.

A structure described in Item 3 is the objective lens described in Item 2, wherein the following expression is satisfied.

$$-1.0 \times 10^{-3} < C_4 < -1.0 \times 10^{-4}$$

A structure described in Item 4 is the objective lens described in Item 3, wherein the following expression is satisfied.

$$-7.0 \times 10^{-4} < C_4 < -4.5 \times 10^{-4}$$

By making the coefficient $C_4$ to be smaller than zero as in the structure described in Item 2, the diffracted light with wavelength $\lambda 1$ generated when passing through the diffractive structure receives a diffracting effect having a sign which is opposite to that of spherical aberration caused by a lens material when a wavelength changes, which makes it possible to correct spherical aberration characteristics in the case of changes in wavelength and temperature. Since an amount of spherical aberration in the case of changes in wavelength and temperature is proportional to the fourth power of NA, this technology is effective when it is used on BD having higher NA.

Incidentally, for making wavelength characteristics and temperature characteristics to be balanced, it is preferable to make the coefficient $C_4$ to be within the range in Item 3, and when the objective lens is made of ordinary optical resin such as, for example, "ZEONEX" (product name) made by Nippon Zeon Co. or "APEL" (product name) made by Mitsui Petroleum Chemical Industry Co., it is preferable to make the coefficient $C_4$ to be within the range in Item 4.

A structure described in Item 5 is the objective lens described in Item 3 or Item 4, wherein the diffractive structure is a diffractive structure formed of a plurality of ring-shaped zones each being a concentric circle around an optical axis, and its cross section including an optical axis has a serrated shape, and distance d of a step of each of the plurality of ring-shaped zones along an optical axis satisfies the flowing expression;

$$(2N-1) \times \lambda 1/(n1-1) \leq d < 2N \times \lambda 1/(n1-1),$$

where n1 represents a refractive index of the objective lens for a light flux with the wavelength λ1, and N represents a natural number.

A structure described in Item 6 is the objective lens described in Item 5, wherein N=2 holds.

If distance d of the step is established so that an optical path difference in approximate odd-numbered multiple may be given to the light flux with wavelength λ1, as in the structure described in Item 5, $N^{th}$ order diffracted light and $(N-1)^{th}$ order diffracted light which are substantially the same in terms of diffraction efficiency are generated from the light flux with wavelength λ3 (1.8×λ1≦λ3≦2.2×λ1) that enters the diffractive structure. In this case, when a comparison is drawn between an occasion to use $N^{th}$ order diffracted light having a smaller amount of spherical aberration in the magnification identical to the aforesaid optical system magnification m1 among two diffracted light for reproducing and recording for the third optical disc, and an occasion wherein distance d of the step is established so that 2N×λ1/(n1−1)≦d<(2N+1)×λ1/(n1−1) may be satisfied, namely, that an optical path difference in even-numbered multiple may be given to the first light flux with wavelength λ1, and the diffracted light having the maximum diffraction efficiency among light fluxes with wavelength λ3 generated when passing through the diffractive structure, is used for reproducing and recording, the optical system magnification for correcting spherical aberration is closer to zero and aberration caused by tracking is smaller, in the former.

Incidentally, from the viewpoint of preventing a decline of diffraction efficiency in the case of wavelength fluctuations, the lower diffraction order number of the diffracted light is better, and if N is made to be equal to 2 as in Item 6, an optical system magnification of the objective lens for the first optical disc and the second optical disc becomes substantially to be zero, and coma in the case of tracking, temperature characteristics and wavelength characteristics are excellent.

A structure described in Item 7 is the objective lens described in any one of Items 1-6, wherein a wavefront aberration amount ΔW (λrms) generated when a wavelength of the light flux with wavelength λ1 changes by +5 nm satisfies ΔW≦0.05.

In the structure described in Item 7, spherical aberration caused by wavelength change characteristics of the diffractive structure in the case of temperature changes arrives at a level capable of conducting recording and reproducing.

A structure described in Item 8 is the objective lens described in any one of Items 1-7, wherein at least one of the optical system magnification m1 and the optical system magnification m2 is greater than zero and is not more than 1/100.

In the structure described in Item 8, compatibility for the first optical disc and the second optical disc can be shared by both the diffractive action and magnification changes.

A structure described in Item 9 is the objective lens described in any one of Items 1-8, wherein the diffractive power of the diffractive structure is negative.

By making the diffractive power to be negative as in Item 9, it is possible to correct chromatic aberration of a light flux with wavelength λ1 or wavelength λ2 in the case of conducting reproducing and/or recording of information for the first optical disc and the second optical disc.

A structure described in Item 10 is the objective lens described in Item 9, wherein a change amount of a position where a wavefront aberration is minimum dfb/dλ of the objective lens for the light flux with wavelength λ1 per 1 nm of wavelength change satisfies $$|dfb/d\lambda| \leq 0.1 \; (\mu m/nm)$$

where fb represents a distance from the objective lens to the first optical disc.

A structure described in Item 11 is the objective lens described in Item 9, wherein a change amount of a position where a wavefront aberration is minimum dfb/dλ of the objective lens along an optical axis per 1 nm of a wavelength change for the wavelength λ2 satisfies;

$$|dfb/d\lambda| \leq 0.1 \; (\mu m/nm),$$

where fb represents a distance from the objective lens to the second optical disc.

A structure described in Item 12 is the objective lens described in any one of Items 1-11, satisfying an expression t1=t2.

In the structure described in Item 12, compatibility between the first optical disc and the second optical disc is only for correction of spherical aberration caused by chromatic aberration of wavelength λ1 and chromatic aberration of wavelength λ2, and a difference between optical system magnifications m1 and m2 and wavelength-dependence of a diffractive action can be made small.

A structure described in Item 13 is the objective lens described in any one of Items 1-11, satisfying an expression NA1=NA2 when NA1 represents a numerical aperture of the emergence side of the objective lens on for the light flux with wavelength λ1, and NA2 represents a numerical aperture of the emergence side of the objective lens for the light flux with wavelength λ2.

In the structure described in Item 13, a difference of effective diameters of objective lenses in the case of conducting recording and reproducing for the first optical disc and the second optical disc is small, and thereby, aperture restriction does not need to be provided individually.

A structure described in Item 14 is the objective lens described in any one of Items 1-13, wherein the first light source and the second light source are provided as separated bodies.

A structure described in Item 15 is the objective lens described in Item 14, wherein the first light source and the second light source are arranged on the optical axis respectively.

A structure described in Item 16 is the objective lens described in any one of Items 1-15, wherein a chromatic aberration correcting element having a function to correct chromatic aberration of a passing light flux, is provided on an optical path of at least one of the light fluxes respectively with wavelength λ1 and wavelength λ2.

In the structure described in Item 16, even when chromatic aberration can be corrected by the objective lens only for one light flux among light fluxes respectively with wavelength λ1 and wavelength λ2, chromatic aberration can be corrected also for the other wavelength by the chromatic aberration correcting element.

A structure described in Item 17 is the objective lens described in Item 16, wherein the chromatic aberration correcting element is a collimating lens.

A structure described in Item 18 is the objective lens described in any one of Items 1-11, wherein the objective lens is further used for an optical pickup apparatus reproducing and/or recording information by using the light flux with wavelength λ3 (1.8×λ1≦λ3≦2.2×λ1) emitted from the third light source for the third optical disc with a protective substrate with thickness t3 (t2<t3), and the light fluxes respectively with wavelengths λ1, λ2 and λ3 enter the objective lens.

A structure described in Item 19 is the objective lens described in Item 18, wherein an aperture limiting element is arranged on an optical path of the light flux with wavelength λ3.

According to the structure described in Item 19, an aperture for a light flux with the wavelength λ3 can be limited.

A structure described in Item 20 is the objective lens described in Item 18 or Item 19, wherein optical system magnification m3 of the objective lens for the light flux with wavelength λ3 satisfies the following expression.

$-1/10 \leq m3 \leq -1/100$

In the structure described in Item 20, tracking characteristics for the light flux with wavelength λ3 are on the level that makes recording and reproducing possible.

A structure described in Item 21 is the objective lens described in any one of Items 18-20, wherein the first light source, the second light source and the third light source are provided as separated bodies.

A structure described in Item 22 is the objective lens described in Item 21, wherein each of the first light source, the second light source and the third light source is provided on the optical axis.

A structure described in Item 23 is the objective lens described in any one of Items 18-22, wherein a chromatic aberration correcting element having a function to correct chromatic aberration of a passing light flux, is provided on an optical path of at least one of the light fluxes respectively with wavelength λ1, wavelength λ2 and wavelength λ3.

In the structure described in Item 23, even when chromatic aberration can be corrected by the objective lens only for one light flux among light fluxes respectively with wavelength λ1, wavelength λ2 and wavelength λ3, chromatic aberration can be corrected also for the other wavelength by the chromatic aberration correcting element.

A structure described in Item 24 is the objective lens described in Item 23, wherein the chromatic aberration correcting element is a collimating lens.

A structure described in Item 25 is the objective lens described in any one of Items 1-22, wherein focal length f1 of the objective lens for the light flux with wavelength λ1 satisfies the following expression.

$0.8 \text{ mm} \leq f1 \leq 4.0 \text{ mm}$

A structure described in Item 26 is the objective lens described in any one of Items 1-25, wherein the objective lens is made of plastic.

A structure described in Item 27 is an optical pickup apparatus for at least reproducing and/or recording information for the first optical disc having a protective substrate with thickness t1 and the second optical disc having a protective substrate with thickness t2 (0.8×t1≦t2), the optical pickup apparatus including the first light source for emitting a light flux with wavelength λ1 for reproducing and/or recording information for the first optical disc, the second light source for emitting a light flux with wavelength λ2 (1.5×λ1≦λ2≦1.7×λ1) for reproducing and/or recording information for the second optical disc, and the objective lens described in any one of Items 1-26 that converges the light flux with wavelength λ1 and the light flux with wavelength λ2 on an information recording surfaces of the first optical disc and on that of the second optical disc, respectively.

A preferred embodiment for practicing the invention will be explained in detail as follows, referring to the drawings.

FIG. 5 is a diagram showing schematically the structure of optical pickup apparatus PU capable of conducting recording and reproducing of information properly for any of HD (first optical disc), DVD (second optical disc) and CD (third optical disc). Optical specifications of HD include wavelength λ1=407 nm, protective layer (protective substrate) PL1 thickness t1=0.6 mm and numerical aperture NA1=0.65, optical specifications of DVD include wavelength λ2=655 nm, protective layer PL2 thickness t2=0.6 mm and numerical aperture NA2=0.65, and optical specifications of CD include wavelength λ3=785 nm, protective layer PL3 thickness t3=1.2 mm and numerical aperture NA3=0.51.

However, the combination of the wavelength, the protective layer thickness and the numerical aperture is not limited to the foregoing. Further, BD having thickness t1 of about 0.1 mm for protective layer PL1 may also be used as the first optical disc.

Further, optical system magnification (first magnification m1) of the objective lens in the case of conducting recording and/or reproducing of information for the first optical disc is to be m1=0. Namely, in the structure of the objective lens OBJ in the present embodiment, the first light flux with wavelength λ1 enters the objective lens as collimated light.

Further, optical system magnification (second magnification m2) of the objective lens in the case of conducting recording and/or reproducing of information for the second optical disc is under the condition of 0<m2≦1/100. Namely, in the structure of the objective lens OBJ in the present embodiment, the second light flux enters the objective lens as gently converged light.

Incidentally, in the invention, a condition has only to be that at least one of the first magnification m1 and the second magnification m2 is not zero, and an expression m1≠m2 holds, and within a range of optical system magnification satisfying the aforesaid condition, the second light flux may be made to enter as collimated light and the first light flux may be made to enter as gently converged light, or both of the first light flux and the second light flux may be made to enter as gently converged light.

Further, with regard to the optical system magnification (third magnification m3) of the objective lens in the case of conducting recording and/or reproducing of information for the third optical disc, there is no limitation in particular, and in the structure in the present embodiment, the third light flux enters as gently divergent light ($-1/10 \leq m3 \leq -1/100$).

The optical pickup apparatus PU includes: violet semiconductor laser LD1 (first light source) emitting a laser light flux (first light flux) that is emitted when conducting recording and reproducing of information for HD and has a wavelength of 407 nm; photo-detector PD1 for the first light flux, red semiconductor laser LD2 (second light source) emitting a laser light flux (second light flux) that is emitted when conducting recording and/or reproducing of information for DVD and has a wavelength of 655 nm; photo-detector PD2 for the second light flux; infrared semiconductor laser LD3 (third light source) emitting a laser light flux (third light flux) that is emitted when conducting recording and reproducing of information for CD and has a wavelength of 785 nm; and photo-detector PD3 for the third light flux, collimating lens COL through which only the first light flux passes. The optical pickup apparatus PU further includes: objective lens OBJ whose optical surface has thereon a diffractive structure, and whose both sides having a function to converge a laser light flux on each of information recording surfaces RL1, RL2 and RL3 are aspheric; a biaxial actuator (not shown) that moves the objective lens in the prescribed direction; first beam splitter BS1; second beam splitter BS2; third beam splitter BS3; fourth beam splitter BS4; diffraction plate G; diaphragm STO; and sensor lenses SEN1 and SEN2.

In optical pickup apparatus PU, when conducting recording and reproducing of information for HD, violet semiconductor laser LD1 is made to emit light first, as a light path is drawn with solid lines in FIG. 5. A divergent light flux emitted from the violet semiconductor laser LD1 passes through the first beam splitter BS1 and arrives at collimating lens COL.

Then, when passing through the collimating lens COL, the first light flux is converted into collimated light which passes through second beam splitter BS2, third beam splitter BS3 and diaphragm STO to arrive at objective lens OBJ to become a spot formed by the objective lens OBJ on information recording surface RL1 through first protective layer PL1. The objective lens OBJ is moved for focusing and tracking by a biaxial actuator that is arranged around the objective lens.

A reflected light flux modulated by information pits on the information recording surface RL1 passes again through objective lens OBJ, third beam splitter BS3, second beam splitter BS2 and collimating lens COL to be branched by the first beam splitter BS1, then, is given astigmatism by sensor lens SEN1, and is converged on a light-receiving surface of photo-detector PD1. Thus, by using output signals of the photo-detector PD1, it is possible to read information recorded on HD.

Further, when conducting recording and reproducing of information for DVD, red semiconductor laser LD2 is made to emit light first, as a light path is drawn with one-dot chain lines in FIG. 5. A divergent light flux emitted from the red semiconductor laser LD2 passes through diffraction plate G, then, is reflected by third beam splitter BS3, and passes through diaphragm STO to arrive at objective lens OBJ as a gently converged light, to become a spot formed by the objective lens OBJ on information recording surface RL2 through second protective layer PL2. The objective lens OBJ is moved for focusing and tracking by a biaxial actuator that is arranged around the objective lens.

A reflected light flux modulated by information pits on the information recording surface RL2 passes again through objective lens OBJ, then, its course is changed when passing through diffraction plate G after being reflected by third beam splitter BS3, and is converged on a light-receiving surface of photo-detector PD2. Thus, by using output signals of the photo-detector PD2, it is possible to read information recorded on DVD.

Further, when conducting recording and reproducing of information for CD, infrared semiconductor laser LD3 is made to emit light first, as a light path is drawn with dotted lines in FIG. 5. A divergent light flux emitted from the infrared semiconductor laser LD3 passes through fourth beam splitter BS4 to be reflected by the second beam splitter BS2, then, passes through third beam splitter BS3 and diaphragm STO to arrive at objective lens OBJ, to become a spot formed by the objective lens OBJ on information recording surface RL3 through third protective layer PL3. The objective lens OBJ is moved for focusing and tracking by a biaxial actuator that is arranged around the objective lens.

A reflected light flux modulated by information pits on the information recording surface RL3 passes again through objective lens OBJ and third beam splitter BS3, then, is reflected by second beam splitter BS2 to be branched by fourth beam splitter BS4, and is given astigmatism by sensor lens SEN2 to be converged on a light-receiving surface of photo-detector PD3. Thus, by using output signals of the photo-detector PD3, it is possible to read information recorded on CD.

Next, a structure of the objective lens OBJ will be explained.

An objective lens is a plastic single lens whose plane of incidence S1 (optical surface on the light source side) and plane of emergence S2 (optical surface on the optical disc side) are constituted with an aspheric surface. On the most area of the plane of incidence S1, there is formed diffractive structure DOE, and the plane of emergence S2 is a refracting interface (refractive surface).

The diffractive structure DOE is made of plural ring-shaped zones in a form of concentric circles each having its center on the optical axis, and its sectional view including an optical axis is in a serrated form. Distance d of a step is established so that the distance d in the optical axis direction of each ring-shaped zone may satisfy the following expression:

$$(2N-1) \times \lambda 1/(n1-1) \leq d < 2N \times \lambda 1/(n1-1),$$

where n1 represents a refractive index of the objective lens for a light flux with the wavelength $\lambda 1$, and N represents a natural number, namely, an optical path difference in odd-numbered multiple may be given to the first light flux with wavelength $\lambda 1$. Owing to this, diffraction efficiency of diffracted light (for example, +third order diffracted light, for N=2) for which the diffraction order number is an odd number for wavelength 407 nm (refractive index of the objective lens on which diffractive structure DOE is formed for wavelength 407 nm is 1.559806) becomes 100% substantially, and when the second light flux (refractive index of the objective lens on which diffractive structure DOE is formed for wavelength 655 nm is 1.540725) enters the diffractive structure DOE, diffraction efficiency that +second order diffracted light is 88% is produced, whereby, sufficient diffraction efficiency can be obtained in both wavelength areas for the first light flux and the second light flux.

On the other hand, when the third light flux (refractive index of the objective lens on which diffractive structure DOE is formed for wavelength 785 nm is 1.537237) enters the diffractive structure DOE, + second order diffracted light and +third order diffracted light are generated at nearly the same percentage of about 40%. In this case, when making a comparison between an occasion wherein the second diffracted light having smaller amount of spherical aberration in the same magnification as in the aforesaid optical system magnification m1 among two diffracted light is used for reproducing and recording for CD, and an occasion wherein distance d of a step is established so that $2N \times \lambda 1/(n1-1) \leq d < (2N+1) \times \lambda 1/(n1-1)$ may be satisfied, namely, an optical path difference in approximate even-numbered multiple may be given to the first light flux with wavelength $\lambda 1$, and the diffracted light having the maximum diffraction efficiency among the third light flux generated when passing through the diffractive structure is used for reproducing and recording for CD, an optical system magnification for correcting spherical aberration is closer to zero and aberration caused in the course of tracking can be made smaller, in the former.

The diffractive structure DOE is expressed by an optical path difference that is added to a transmission wave front by this structure, and this optical path difference is expressed by optical path difference function φ(h) (mm) that is defined by substituting a prescribed coefficient in the following Numeral 1, when h (mm) represents a height in the direction perpendicular to the optical axis, $C_{2i}$ represents a coefficient of the optical path difference function and i represents a natural number.

Optical path difference function (Numeral 1)

$$\Phi(h) = \sum_{i=0} C_{2i} h^{2i}$$

In the present embodiment, $C_4$ in the Numeral 1 above is established to satisfy $C_4<0$ SO that the diffractive structure DOE may have a positive diffractive action.

Incidentally, it is preferable to satisfy $-1.0 \times 10^{-3} < C_4 < -1.0 \times 10^{-4}$, and it is more preferable to satisfy $-7.0 \times 10^{-4} < C_4 < -4.5 \times 10^{-4}$.

By setting the diffractive structure DOE as stated above, it is possible to give positive diffractive action to at least one light flux (first light flux with wavelength λ1, in the present embodiment) among light fluxes respectively with wavelength λ1, wavelength λ2 and wavelength λ3 passing through the diffractive structure, and to control an amount of changes in wavefront aberration originating from wavelength fluctuation of the first light flux caused by changes in ambient temperatures, thus, an objective lens excellent in temperature characteristics can be obtained.

Specifically, a wavefront aberration change amount ΔW (λ rms) generated in the case where a wavelength of a light flux with wavelength λ1 is fluctuated by +5 nm by ambient temperature changes is established to satisfy ΔW≦0.05.

It is further preferable that the diffractive structure has negative diffractive power, whereby, chromatic aberration of a light flux with wavelength λ1 or λ2 in the case of conducting reproducing and/or recording of information for HD and DVD can be corrected.

To be concrete, by setting the diffractive structure DOE so that a change amount of a position where a wavefront aberration is minimum dfb/dλ of the objective lens along an optical axis per 1 nm of a wavelength change for the wavelength λ1 may satisfy |dfb/dλ|≦0.1 (μm/nm), chromatic aberration of the light flux with wavelength λ1 can be corrected, and an objective lens having excellent wavelength characteristics can be obtained. Further, by setting the diffractive structure DOE so that a change amount of a position where a wavefront aberration is minimum dfb/dλ of the objective lens along an optical axis per 1 nm of a wavelength change for the wavelength λ2 may satisfy |dfb/dλ|≦0.1 (μm/nm), chromatic aberration of the light flux with wavelength λ2 can be corrected, and an objective lens having excellent wavelength characteristics can be obtained.

In the present embodiment, the first light source, the second light source and the third light source are arranged separately and on the optical axis, and sine conditions of the objective lens are satisfied for a high density optical disc having mainly a narrow tolerance of performance.

Therefore, when a high density optical disc is used, even when gently converged light, for example, enters the objective lens OBJ, coma caused by tracking of the objective lens OBJ is not a problem, and in the case of CD, a magnification among the magnification and sine conditions both representing main causes for generation of coma in the case of tracking of the objective lens OBJ, is small, whereby the coma turns out to be at the level that is fit for the sufficient use for recording and reproducing, thus, an objective lens excellent in tracking characteristic can be obtained, although the sine conditions are not satisfied because the protective layer thickness and an optical system magnification of the objective lens are greatly different for a high density optical disc.

Incidentally, when coma in the course of tracking needs to be further corrected, a coma correcting element may be provided to be closer to the light source on the objective lens OBJ, or a collimating lens or a coupling lens having a correcting function may be provided.

It is further possible to employ the structure wherein aperture limiting element AP is arranged in the vicinity of optical surface S1 of the objective lens OBJ, as an aperture limiting element for restricting an aperture corresponding to, NA3, and the aperture limiting element AP and the objective lens OBJ are driven for tracking integrally by a biaxial actuator.

On an optical surface of the aperture limiting element AP in this case, there is formed wavelength-selecting filter WF having the transmittance wavelength selectivity. This wavelength-selecting filter WF makes an area within NA3 to transmit all wavelengths from the first wavelength λ1 to the third wavelength λ3, then, intercepts only the third wavelength λ3 in the area from NA3 to NA1, and has the transmittance wavelength selectivity to transmit the first wavelength λ1 and the second wavelength λ2, which makes it possible to conduct aperture restriction corresponding to NA3 with the wavelength selectivity.

Further, a method to restrict an aperture also includes a method to switch an aperture mechanically and a method to utilize liquid crystal phase control element LCD which will be described later, in addition to the method to utilize the wavelength-selecting filter WF.

Though it is preferable, from the viewpoints of light weight and low prices, that the objective lens OBJ is made of plastic, it may also be made of glass if light stability and temperature stability are taken into consideration. Though a refraction type glass mold aspheric lens is mainly on the market presently, a glass mold lens on which a diffractive structure is provided may also be manufactured, if low-melting glass under development is used. Further, under the circumstances of development of plastic for optical use, there is available a material wherein a change of refractive index caused by temperature changes is less. This material is one wherein a change of refractive index of the total resin caused by temperature changes is made small, by mixing inorganic fine particles in which signs of refractive index changes are opposite to each other depending on temperatures, and in the same way, there is a material in which dispersion of the total resins is made small by mixing inorganic fine particles having small dispersion, thus, if these materials are used for the objective lens for BD, more effect is produced.

As these resins, there may be used resin composition (X) that includes polymer (A) having an ethylenically unsaturated monomer unit containing an alicyclic group and antioxidant (B) having a phosphoric ester structure and phenol structure in a molecule.

Resin composition (Y) including polymer (A) having an ethylenically unsaturated monomer unit containing an alicyclic group and antioxidant (B) expressed by general formula (1) can also be used.

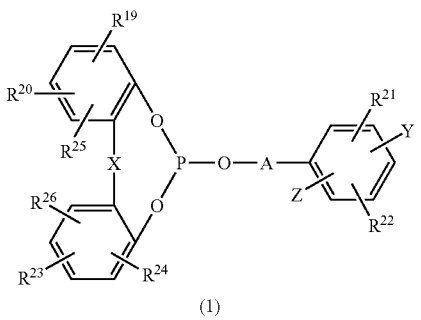

(Formula 1)

(1)

In the general formula (1), R19 through R24 each independently represent a hydrogen atom, an alkyl group having 1-8 carbon atoms, a cycloalkyl group having 5 to 8 carbon atoms, an alkyl cycloalkyl group having 6 to 12 carbon atoms, an aralkyl group having 7 to 12 carbons or a phenyl group, and R25-R26 each independently represent a hydrogen atom or an alkyl group having 1 to 8 or carbon atoms. X represents single bond, a sulfur atom or CHR27-group (R27 represents a hydrogen atom, an alkyl group having 1 to 8 carbons or a cycloalkyl group having 5 to 8 carbon atoms). A represents an alkylene group having 2 to 8 carbon atoms or a *–COR28-group (R28 shows single bond or an alkylene group having 1 to 8 carbons, and the symbol "*" shows that it is bonded to the oxygen side). Either one of Y and Z represents a hydroxyl group, an alkoxy group having 1 to 8 carbon atoms or an aralkyloxy group having 7 to 12 carbon atoms, and the other represents a hydrogen atom or an alkyl group having 1 to 8 carbon atoms.

Further, it is preferable that the aforesaid resins (X) and (Y) further contain hindered amine type antioxidant.

It is further preferable that the aforesaid resins (X) and (Y) further contain hindered amine type light stabilizer (D). The hindered amine type light stabilizer (D) is a substance having a number-average molecular weight of 1500-5000 selected from a group including a polycondensation compound of dibutylamine, 1,3,5-triazine, and N,N'-bis(2,2,6,6-tetramethyl-4-piperidyl)butylamine, poly[{(1,1,3,3-tetramethylbutyl)amino-1,3,5-triazie-2,4-diil}{(2,2,6,6-tetramethyl-4-piperidyl)imino}hexamethylene{(2,2,6,6-tetramethyl-4-piperidyl)imino}] and a polymerization compound of dimethylsuccinate and 4-hydroxy-2,2,6,6-tetramethyl-1-piperidineethanol.

Further, there is provided another embodiment shown in FIG. 6 according to the present invention. FIG. 6 is a diagram showing schematically the structure of optical pickup apparatus PU capable of conducting recording and reproducing of information properly for any of HD (first optical disc), DVD (second optical disc) and CD (third optical disc). Here, parts in this embodiment different from the embodiment shown in FIG. 5 are described below.

In FIG. 6, a light flux emitted from first semiconductor laser LD1 (wavelength $\lambda 1=380$ nm-450 nm) representing the first light source is transmitted through first beam splitter BS1, then, is converted by collimating lens COL1 representing a correction element into a parallel light flux, and further passes second beam splitter BS2 and third beam splitter BS3 to be stopped down by diaphragm STO, and is converged by objective lens OBJ that serves as a light-converging optical element on information recording surface RL1 through protective layer PL1 (thickness $t1=0.5$ mm-0.7 mm) of the first optical disc.

Then, the light flux modulated by information bits and reflected on the information recording surface RL1 is transmitted through the objective lens OBJ and diaphragm STO again, then, passes through third beam splitter BS3 and second beam splitter BS2 and collimating lens COL1 to enter the first beam splitter BS1 where the light flux is reflected, and is given astigmatism by a cylindrical lens in sensor lens SEN1, and enters photo detector PD1 through a concave lens. Thus, reading signals of information recorded on information recording surface RL1 of the first optical disc are obtained by the use of output signals coming from the photo-detector PD1.

Changes in an amount of light caused by changes of a form and of a position of a spot on the photo-detector PD1 are detected for focusing detection and track detection. Based on this detection, a two-dimensional actuator (not shown) moves objective lens OBJ so that a light flux emitted from the first semiconductor laser LD1 may form an image on recording surface RL1 of the first optical disc, and moves objective lens OBJ so that a light flux emitted from the semiconductor laser LD1 may form an image on a prescribed track.

On the other hand, a light flux emitted from second semiconductor laser LD2 (wavelength $\lambda 2=600$ nm-700 nm) is transmitted through fourth beam splitter BS4, then, is converted by collimating lens COL2 representing a correction element into a parallel light flux, and further is reflected by second beam splitter BS2, and is further transmitted through third beam splitter BS3 to be stopped down by diaphragm STO, and is converged by objective lens OBJ on information recording surface RL2 through protective layer PL2 (thickness $t2=0.5$ mm-0.7 mm) of the second optical disc.

Then, the light flux modulated by information bits and reflected on the information recording surface RL2 is transmitted through the objective lens OBJ, diaphragm STO, third beam splitter BS3 again, then, enters second beam splitter BS2 where the light flux is reflected, and passes through collimating lens COL2 to enter fourth beam splitter BS4 to be reflected further, and is given astigmatism by a cylindrical lens of sensor lens SEN2, and enters photo-detector PD2 through a concave lens. Thus, reading signals of information recorded on the second optical disc are obtained by the use of output signals coming from the photo-detector PD2.

Changes in an amount of light caused by changes of a form and of a position of a spot on the photo-detector PD2 are detected for focusing detection and track detection. Based on this detection, a two-dimensional actuator (not shown) moves objective lens OBJ so that a light flux emitted from the second semiconductor laser LD2 may form an image on recording surface RL2 of the second optical disc, and moves objective lens OBJ so that a light flux emitted from the semiconductor laser LD2 may form an image on a prescribed track.

Furthermore, a light flux emitted from third semiconductor laser LD3 (wavelength $\lambda 3=750$ nm-800 nm) is transmitted through diffractive optical element G and coupling lens CUL, and is reflected by third beam splitter BS3 to be stopped down by diaphragm STO, and is converged by objective lens OBJ on information recording surface RL3 through protective layer PL3 (thickness $t3=1.2$ mm) of the third optical disc.

Then, the light flux modulated by information bits and reflected on the information recording surface RL3 is transmitted through the objective lens OBJ, diaphragm STO again, then, enters third beam splitter BS3 where the light flux is reflected, and passes through coupling lens CUL and enters photo-detector PD3 through diffractive optical element G. Thus, reading signals of information recorded on the third optical disc are obtained by the use of output signals coming from the photo-detector PD3.

Changes in an amount of light caused by changes of a form and of a position of a spot on the photo-detector PD3 are detected for focusing detection and track detection. Based on this detection, a two-dimensional actuator (not shown) moves objective lens OBJ so that a light flux emitted from the third semiconductor laser LD3 may form an image on recording surface RL3 of the third optical disc, and moves objective lens OBJ that a light flux emitted from the semiconductor laser LD3 may form an image on a prescribed track.

Incidentally, though collimating lenses COL1 and COL2 are provided respectively in an optical path between the first semiconductor laser LD2 and objective lens OBJ and in an optical path between the second semiconductor laser LD2 and objective lens OBJ, in FIG. 6, it is also possible to provide a collimating lens equipped with a correction function in either one of the optical paths. The Example 7 which will be explained later corresponds to an occasion wherein collimating lens COL1 (for high density DVD) only has a correction function, and compatibility for HD (high density DVD), DVD and CD is given (which means that recording/reproducing of information is made to be capable of being conducted for any one of the aforementioned optical information recording media).

By forming a diffractive structure having a positive diffractive action on an optical surface of the objective lens as stated above, and by setting so that optical system magnification m1 of the objective lens for a light flux with wavelength λ1 and optical system magnification m2 of the objective lens for a light flux with wavelength λ2 have different signs and values from each other, an objective lens with compatibility excellent in wavelength characteristics, temperature characteristics and tracking characteristics, and an optical pickup apparatus are obtained.

EXAMPLES

Examples of the optical element shown in the embodiment stated above will be explained as follows. In these examples, each of Examples 1 to 6 corresponds to an embodiment shown in FIG. 5, and Example 7 corresponds to an embodiment shown in FIG. 6.

Example 1

Table 1 shown lens data of Example 1.

TABLE 1

| Example 1 Lens data | | | |
|---|---|---|---|
| Focal length of objective lens | $f_1 = 3.2$ mm | $f_2 = 3.27$ mm | $f_3 = 3.27$ mm |
| Numerical aperture on the image side | NA1: 0.65 | NA2: 0.65 | NA3: 0.51 |
| Diffraction order number on $2^{nd}$ surface | n1: 3 | n2: 2 | n3: 2 |
| Magnification | m1: 0 | m2: 1/185.2 | m3: −1/55.6 |

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | ∞ | | −600.00 | | 185.00 | |
| 1 *1 | ∞ | 0.1 (φ4.16 mm) | | 0.1 (φ4.23 mm) | | 0.1 (φ3.40 mm) | |
| 2 | 2.02108 | 1.90000 | 1.542771 | 1.90000 | 1.52915 | 1.90000 | 1.52541 |
| 3 | −9.54846 | 1.75 | 1.0 | 1.78 | 1.0 | 1.48 | 1.0 |
| 4 | ∞ | 0.6 | 1.61869 | 0.6 | 1.57752 | 1.2 | 1.57063 |
| 5 | ∞ | | | | | | |

*1: (Aperture diameter)
* The symbol di shows displacement from $i^{th}$ surface to $(i + 1)^{th}$ surface.

Aspheric surface data

| Second surface Aspheric surface coefficient | |
|---|---|
| κ | $-4.4201 \times E-1$ |
| A4 | $-6.6218 \times E-4$ |
| A6 | $-1.4866 \times E-3$ |
| A8 | $+5.2339 \times E-4$ |
| A10 | $-1.0140 \times E-4$ |
| A12 | $+8.5260 \times E-6$ |
| A14 | $-1.1279 \times E-6$ |
| Optical path difference function | |
| B2 | $-2.5983$ |
| B4 | $-2.8209 \times E-1$ |
| B6 | $-2.7379 \times E-1$ |
| B8 | $+5.2628 \times E-2$ |
| B10 | $-5.2204 \times E-3$ |
| Third surface Aspheric surface coefficient | |
| κ | $-1.7944 \times E+2$ |
| A4 | $-9.8565 \times E-3$ |
| A6 | $+1.1687 \times E-2$ |
| A8 | $-5.1568 \times E-3$ |
| A10 | $+1.1684 \times E-3$ |
| A12 | $-1.4004 \times E-4$ |
| A14 | $+7.0266 \times E-6$ |

As shown in Table 1, the objective lens of the present example is an objective lens with compatibility for HD, DVD and CD, and focal length f1 is set to 3.20 mm, magnification m1 is set to 0 and NA1 is set to 0.65 for wavelength λ1 of 407 nm, focal length f2 is set to 3.27 mm, magnification m2 is set to 1/185.2 and NA2 is set to 0.65 for wavelength λ2 of 655 nm, and focal length f3 is set to 3.27 mm, magnification m3 is set to −1/55.6 and NA3 is set to 0.51 for wavelength λ3 of 785 nm.

Each of a plane of incidence (second surface) and a plane of emergence (third surface) is formed to be an aspheric surface that is stipulated by a numerical expression wherein a coefficient shown in Table 1 is substituted in the following Numeral 2, and is axially symmetric about optical axis L;

$$x = \frac{h^2/r}{1+\sqrt{1-(1+\kappa)(h/r)^2}} + \sum_{i=2} A_{2i} h^{2i}$$ (Numeral 2)

where, x represents an axis in the optical axis direction (traveling direction of light is positive), κ represents a conic constant and $A_{2i}$ represents an aspheric surface coefficient.

On each of the second surface and the third surface, there is formed diffractive structure DOE. This diffractive structure DOE is expressed by an optical path difference added to a transmission wave front by this structure. This optical path difference is expressed by optical path difference function φ (h) (mm) defined by substituting a coefficient shown in Table 1 in the following Numeral 3, when h (mm) represents a height in the direction perpendicular to the optical axis, $B_{2i}$ represents an optical path difference function coefficient, n represents a diffraction order number of diffracted light having the maximum diffraction efficiency among diffracted light of an incident light flux, λ(nm) represents a wavelength of a light flux entering the diffractive structure, λB (nm) represents a manufacture wavelength of the diffractive structure and λB represents blaze wavelength (1.0 mm in the present example) of the diffractive structure DOE.

Optical path difference function (Numeral 3)

$$\Phi(h) = \left(\sum_{i=0}^{5} B_{2i} h^{2i}\right) \times n \times \frac{\lambda}{\lambda B}$$

Incidentally, the Numeral 1 above is one wherein ($B_{2i} \times n \times \lambda/\lambda B$) is replaced by $C_{2i}$ in Numeral 3. Namely, the relationship of $B_{2i} \times n \times \lambda/\lambda B = C_{2i}$ holds.

In Example 1, when wavefront aberration under the standard condition of HD is 0.001 λrms, wavefront aberration in the case of wavelength fluctuation (−5 nm) accompanied by no ambient temperature change is 0.042 λrms, wavefront aberration in the case of wavelength fluctuation (+1.5 nm, +30° C.) accompanied by ambient temperature change is 0.040 λrms, and wavefront aberration generated when the second light flux enters as a gently converged light in the case of tracking of the objective lens (in the case of moving by 0.3 mm in the direction perpendicular to the optical axis) is 0.001 λrms.

Thus, the foregoing confirmed that the objective lens of the present example has excellent wavelength characteristics, temperature characteristics and tracking characteristics.

Example 2

Table 2 shows lens data of Example 2.

TABLE 2

| Example 2 Lens data | | | |
|---|---|---|---|
| Focal length of objective lens | $f_1$ = 3.2 mm | $f_2$ = 3.27 mm | $f_3$ = 3.27 mm |
| Numerical aperture on the image side | NA1: 0.65 | NA2: 0.65 | NA3: 0.51 |
| Diffraction order number on 2nd surface | n1: 3 | n2: 2 | n3: 2 |
| Magnification | m1: −1/185.2 | m2: 0 | m3: −1/44.8 |

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | 600.00 | | ∞ | | 130.00 | |
| 1 *1 | ∞ | 0.1 (φ4.18 mm) | | 0.1 (φ4.25 mm) | | 0.1 (φ3.41 mm) | |
| 2 | 2.02450 | 1.90000 | 1.542771 | 1.90000 | 1.52915 | 1.90000 | 1.52541 |
| 3 | −9.52153 | 1.76 | 1.0 | 1.80 | 1.0 | 1.50 | 1.0 |
| 4 | ∞ | 0.6 | 1.61869 | 0.6 | 1.57752 | 1.2 | 1.57063 |
| 5 | ∞ | | | | | | |

*1: (Aperture diameter)
* The symbol di shows displacement from $i^{th}$ surface to $(i + 1)^{th}$ surface.

Aspheric surface data

| Second surface Aspheric surface coefficient | |
|---|---|
| κ | −4.4431 × E−1 |
| A4 | −9.1275 × E−4 |
| A6 | −1.4646 × E−3 |
| A8 | +5.2560 × E−4 |
| A10 | −1.0309 × E−4 |
| A12 | +8.1328 × E−6 |
| A14 | −9.6245 × E−7 |

TABLE 2-continued

| | Optical path difference function |
|---|---|
| B2 | −2.7376 |
| B4 | −2.9254 × E−1 |
| B6 | −2.7583 × E−1 |
| B8 | +5.3981 × E−2 |
| B10 | −5.3153 × E−3 |

Third surface
Aspheric surface coefficient

| | |
|---|---|
| κ | −1.7044 × E+2 |
| A4 | −1.0136 × E−2 |
| A6 | +1.1696 × E−2 |
| A8 | −5.1401 × E−3 |
| A10 | +1.1691 × E−3 |
| A12 | −1.4077 × E−4 |
| A14 | +7.0989 × E−6 |

As shown in Table 2, the objective lens of the present example is also an objective lens with compatibility for HD, DVD and CD, and focal length f1 is set to 3.20 mm, magnification m1 is set to −1/185.2 and NA1 is set to 0.65 for wavelength λ1 of 407 nm, focal length f2 is set to 3.27 mm, magnification m2 is set to 0 and NA2 is set to 0.65 for wavelength λ2 of 655 nm, and focal length f3 is set to 3.27 mm, magnification m3 is set to −1/44.8 and NA3 is set to 0.51 for wavelength λ3 of 785 nm.

Each of a plane of incidence (second surface) and a plane of emergence (third surface) is formed to be an aspheric surface that is stipulated by a numerical expression wherein a coefficient shown in Table 2 is substituted in the following Numeral 2, and is axially symmetric about optical axis L.

On each of the second surface and the third surface, there is formed diffractive structure DOE. This diffractive structure DOE is expressed by an optical path difference added to a transmission wave front by this structure, and this optical path difference is expressed by optical path difference function φ(h) (mm) defined by substituting a coefficient shown in Table 2 in the above Numeral 3. Incidentally, a blaze wavelength in the present example is 1.0 mm.

In Example 2, when wavefront aberration under the standard condition of HD is 0.001 λrms, wavefront aberration in the case of wavelength fluctuation (−5 nm) accompanied by no ambient temperature change is 0.043 λrms, wavefront aberration in the case of wavelength fluctuation (+1.5 nm, +30° C.) accompanied by ambient temperature change is 0.042 λrms, and wavefront aberration generated when the first light flux enters as a gently divergent light in the case of tracking of the objective lens (in the case of moving by 0.3 mm in the direction perpendicular to the optical axis) is 0.001 λrms.

Thus, the foregoing confirmed that the objective lens of the present example has excellent wavelength characteristics, temperature characteristics and tracking characteristics.

Example 3

Table 3 shows lens data of Example 3.

TABLE 3

Example 3 Lens data

| | | | |
|---|---|---|---|
| Focal length of objective lens | $f_1$ = 3.1 mm | $f_2$ = 3.23 mm | $f_3$ = 3.23 mm |
| Numerical aperture on the image side | NA1: 0.65 | NA2: 0.65 | NA3: 0.51 |
| Optical system magnification | m1 = 1/28.4 | m2 = 0 | m3 = −1/35.6 |

| $i^{th}$ surface | ri | di (407 nm) | ni (407 nm) | di (655 nm) | ni (655 nm) | di (785 nm) | ni (785 nm) |
|---|---|---|---|---|---|---|---|
| 0 | | −85 | | ∞ | | 117.84 | |
| 1 *1 | ∞ | 0.1 (φ5.10 mm) | | 0.1 (φ5.10 mm) | | 0.0 (φ5.10 mm) | |
| 2 | 1.9749 | 1.76 | 1.5598 | 1.76 | 1.5407 | 1.76 | 1.5372 |
| 2' | 1.9549 | −0.00318 | 1.5598 | −0.00318 | 1.5407 | −0.00318 | 1.5372 |
| 3 | −16.8766 | 1.57 | 1.0 | 1.79 | 1.0 | 1.49 | 1.0 |
| 4 | ∞ | 0.6 | 1.619 | 0.6 | 1.578 | 1.2 | 1.571 |
| 5 | ∞ | | | | | | |

*1: (Aperture diameter)
* The symbol di shows a displacement from $i^{th}$ surface to $(i + 1)^{th}$ surface.

Aspheric surface data

Second surface (0.00 mm ≦ h ≦ 1.923 mm)
Aspheric surface coefficient

| | |
|---|---|
| κ | −5.3412E−01 |
| A4 | −3.6678E−04 |
| A6 | 9.6666E−04 |

TABLE 3-continued

| | |
|---|---|
| A8 | −1.3357E−04 |
| A10 | −6.7434E−05 |
| A12 | 2.5231E−05 |
| A14 | −3.3947E−06 |
| Optical path difference function (HD DVD: Second order DVD: First order CD: First order Blaze wavelength 395 nm) | |
| B2 | −4.1750E−03 |
| B4 | −7.7289E−04 |
| B6 | 2.6030E−04 |
| B8 | −1.1363E−04 |
| B10 | 1.3297E−05 |
| $2^{\prime th}$ surface (1.923 mm < h) Aspheric surface coefficient | |
| κ | −4.6325E−01 |
| A4 | −1.0459E−03 |
| A6 | 1.0481E−03 |
| A8 | −2.2135E−04 |
| A10 | −1.4718E−04 |
| A12 | 4.2668E−05 |
| A14 | −4.4685E−06 |
| Optical path difference function (DVD: First order Blaze wavelength 655 nm) | |
| B2 | −4.8566E−03 |
| B4 | −1.5415E−03 |
| B6 | 5.4916E−04 |
| B8 | −2.6736E−04 |
| B10 | 2.8878E−05 |
| Third surface Aspheric surface coefficient | |
| κ | −6.4929E+01 |
| A4 | 1.0027E−02 |
| A6 | −6.1455E−04 |
| A8 | 9.4174E−03 |
| A10 | 1.3454E−04 |
| A12 | −8.8891E−06 |
| A14 | −1.1303E−07 |

As shown in Table 3, the objective lens of the present example is an objective lens with compatibility for HD, DVD and CD, and focal length f1 is set to 3.1 mm, magnification m1 is set to 1/28.4 and NA1 is set to 0.65 for wavelength λ1 of 407 nm, focal length f2 is set to 3.23 mm, magnification m2 is set to 0 and NA2 is set to 0.65 for wavelength λ2 of 655 nm, and focal length f3 is set to 3.23 mm, magnification m3 is set to −1/35.6 and NA3 is set to 0.51 for wavelength λ3 of 785 nm.

In Example 3, when wavefront aberration under the standard condition of HD is 0.000 λrms, wavefront aberration in the case of wavelength fluctuation (−5 nm) accompanied by no ambient temperature change is 0.024 λrms, wavefront aberration in the case of wavelength fluctuation (+1.5 nm, +30° C.) accompanied by ambient temperature change is 0.019 λrms, and wavefront aberration generated when the first light flux enters as a gently converged light in the case of tracking of the objective lens (in the case of moving by 0.3 mm in the direction perpendicular to the optical axis) is 0.003 λrms.

Thus, the foregoing confirmed that the objective lens of the present example has excellent wavelength characteristics, temperature characteristics and tracking characteristics.

Example 4

Table 4 shows lens data of Example 4.

TABLE 4

| Example 4 Lens data | | | | | | |
|---|---|---|---|---|---|---|
| Focal length of objective lens | $f_1$ = 3.10 mm | | $f_2$ = 3.18 mm | | $f_3$ = 3.20 mm | |
| Numerical aperture on the image side | NA1: 0.65 | | NA2: 0.65 | | NA3: 0.51 | |
| Optical system magnification | m1: 1/33.2 | | m2: −1/125 | | m3: −1/27.9 | |
| $i^{th}$ surface | ri | di (407 nm) | ni (407 nm) | di (655 nm) | ni (655 nm) | di (785 nm) | ni (785 nm) |
| 0 | | −100 | | 400 | | 92.07 | |
| 1 *1 | ∞ | 0.0 (φ3.916 mm) | | 0.0 (φ4.162 mm) | | 0.0 (φ3.374 mm) | |

TABLE 4-continued

| | | | | | | | |
|---|---|---|---|---|---|---|---|
| 2 | 1.8771 | 1.76 | 1.5428 | 1.76 | 1.5292 | 1.76 | 1.5254 |
| 2' | 1.9386 | 0.0036705 | 1.5428 | 0.036705 | 1.5292 | 0.036705 | 1.5254 |
| 3 | −10.8800 | 1.47 | 1.0 | 1.69 | 1.0 | 1.52 | 1.0 |
| 4 | ∞ | 0.6 | 1.619 | 0.6 | 1.578 | 1.2 | 1.571 |
| 5 | ∞ | | | | | | |

*1: (Aperture diameter)
* The symbol di shows a displacement from $i^{th}$ surface to $(i+1)^{th}$ surface.

Aspheric surface data

Second surface (0.00 mm ≦ h ≦ 1.937 mm)
Aspheric surface coefficient

| | |
|---|---|
| κ | −5.7664E−01 |
| A4 | −5.1225E−04 |
| A6 | 1.1730E−03 |
| A8 | −2.5893E−04 |
| A10 | 1.5274E−05 |
| A12 | 3.9428E−06 |
| A14 | −9.3936E−07 |

Optical path difference function (HD DVD: Second order DVD: First order CD: First order Blaze wavelength 395 nm)

| | |
|---|---|
| B2 | 0.0000E+00 |
| B4 | −6.9990E−04 |
| B6 | 26581E−04 |
| B8 | −1.0347E−04 |
| B10 | 1.1697E−05 |

$2'^{th}$ surface (1.937 mm < h)
Aspheric surface coefficient

| | |
|---|---|
| κ | −4.4960E−01 |
| A4 | −8.7504E−04 |
| A6 | 1.0143E−03 |
| A8 | −2.0800E−04 |
| A10 | −1.4014E−04 |
| A12 | 4.4748E−05 |
| A14 | −4.9197E−06 |

Optical path difference function (DVD: First order Blaze wavelength 655 nm)

| | |
|---|---|
| B2 | 1.2369E−03 |
| B4 | −4.7072E−04 |
| B6 | 1.5695E−04 |
| B8 | −8.3251E−05 |
| B10 | 7.9886E−06 |

Third surface
Aspheric surface coefficient

| | |
|---|---|
| κ | −5.4905E+01 |
| A4 | 8.6856E−03 |
| A6 | −4.1025E−04 |
| A8 | −5.0702E−04 |
| A10 | 1.1265E−04 |
| A12 | −6.8623E−06 |
| A14 | −2.0380E−07 |

As shown in Table 4, the objective lens of the present example is an objective lens with compatibility for HD, DVD and CD, and focal length f1 is set to 3.10 mm, magnification m1 is set to 1/33.2 and NA1 is set to 0.65 for wavelength λ1 of 407 nm, focal length f2 is set to 3.18 mm, magnification m2 is set to −1/125 and NA2 is set to 0.65 for wavelength λ2 of 655 nm, and focal length f3 is set to 3.20 mm, magnification m3 is set to −1/27.9 and NA3 is set to 0.51 for wavelength λ3 of 785 nm.

In Example 4, when wavefront aberration under the standard condition of HD is 0.000 λrms, wavefront aberration in the case of wavelength fluctuation (−5 nm) accompanied by no ambient temperature change is 0.028 λrms, wavefront aberration in the case of wavelength fluctuation (+1.5 nm, +30° C.) accompanied by ambient temperature change is 0.040 λrms, and wavefront aberration generated when the first light flux enters as a gently converged light in the case of tracking of the objective lens (in the case of moving by 0.3 mm in the direction perpendicular to the optical axis) is 0.002 λrms.

Thus, the foregoing confirmed that the objective lens of the present example has excellent wavelength characteristics, temperature characteristics and tracking characteristics.

Example 5

Table 5 shows lens data of Example 5.

TABLE 5

Example 5 Lens data

| Focal length of objective lens | $f_1$ = 3.10 mm | $f_2$ = 3.15 mm |
|---|---|---|

TABLE 5-continued

| | | | | |
|---|---|---|---|---|
| Numerical aperture on the image side | NA1: 0.65 | | NA2: 0.65 | |
| Optical system magnification | m1: −1/256.4 | | m2 = 0 | |
| $i^{th}$ surface | ri | di (407 nm) | ni (407 nm) | di (655 nm) | ni (655 nm) |

| $i^{th}$ surface | ri | di (407 nm) | ni (407 nm) | di (655 nm) | ni (655 nm) |
|---|---|---|---|---|---|
| 0 | | 800 | | ∞ | |
| 1 (Aperture diameter) | ∞ | 0.0 (φ4.045 mm) | | 0.0 (φ4.096 mm) | |
| 2 | 2.0515 | 1.76 | 1.5497 | 1.76 | 1.5323 |
| 3 | −10.8313 | 1.73 | 1.0 | 1.74 | 1.0 |
| 4 | ∞ | 0.6 | 1.619 | 0.6 | 1.578 |
| 5 | ∞ | | | | |

Aspheric surface data

Second surface
Aspheric surface coefficient

| | |
|---|---|
| κ | −6.3092E−01 |
| A4 | 2.1514E−03 |
| A6 | 4.6651E−04 |
| A8 | −1.0702E−04 |
| A10 | 4.4963E−05 |
| A12 | −1.2538E−05 |
| A14 | 1.0802E−06 |

Optical path difference function (HD DVD: Fourth order
DVD: Third order Blaze wavelength 410 nm)

| | |
|---|---|
| B2 | −2.5823E−03 |
| B4 | −1.5482E−04 |
| B6 | −7.9668E−06 |
| B8 | −2.2233E−06 |
| B10 | 1.0911E−07 |

Third surface
Aspheric surface coefficient

| | |
|---|---|
| κ | 5.0000E+00 |
| A4 | 1.5698E−02 |
| A6 | −2.7118E−03 |
| A8 | −5.8797E−05 |
| A10 | 1.2863E−04 |
| A12 | −2.2582E−05 |
| A14 | 1.3551E−06 |

As shown in Table 5, the objective lens of the present example is an objective lens with compatibility for HD and DVD, and focal length f1 is set to 3.10 mm, magnification m1 is set to −1/256.4 and NA1 is set to 0.65 for wavelength λ1 of 407 nm, and focal length f2 is set to 3.15 mm, magnification m2 is set to 0 and NA2 is set to 0.65 for wavelength λ2 of 655 nm.

In Example 5, when wavefront aberration under the standard condition of HD is 0.000 λrms, wavefront aberration in the case of wavelength fluctuation (−5 nm) accompanied by no ambient temperature change is 0.009 λrms, wavefront aberration in the case of wavelength fluctuation (+1.5 nm, +30° C.) accompanied by ambient temperature change is 0.060 λrms, and wavefront aberration generated when the first light flux enters as a gently divergent light in the case of tracking of the objective lens (in the case of moving by 0.3 mm in the direction perpendicular to the optical axis) is 0.000 λrms.

Thus, the foregoing confirmed that the objective lens of the present example has excellent wavelength characteristics, temperature characteristics and tracking characteristics.

Example 6

Table 6 shows lens data of Example 6.

TABLE 6

Example 6 Lens data

| | | | |
|---|---|---|---|
| Focal length of objective lens | $f_1$ = 3.10 mm | | $f_2$ = 3.15 mm |
| Numerical aperture on the image side | NA1: 0.65 | | NA2: 0.65 |
| Optical system magnification | m1: −1/256.4 | | m2 = 1/192.3 |

| $i^{th}$ surface | ri | di (407 nm) | ni (407 nm) | di (655 nm) | ni (655 nm) |
|---|---|---|---|---|---|
| 0 | | 800 | | −600 | |
| 1 (Aperture diameter) | ∞ | 0.0 (φ4.045 mm) | | 0.0 (φ4.073 mm) | |
| 2 | 2.0514 | 1.76 | 1.5497 | 1.76 | 1.5323 |
| 3 | −11.1475 | 1.72 | 1.0 | 1.72 | 1.0 |
| 4 | ∞ | 0.6 | 1.619 | 0.6 | 1.578 |
| 5 | ∞ | | | | |

Aspheric surface data

Second surface
Aspheric surface coefficient

| | |
|---|---|
| κ | −6.3592E−01 |
| A4 | 1.9893E−03 |
| A6 | 4.8406E−04 |
| A8 | −1.1063E−04 |
| A10 | 4.1773E−05 |
| A12 | −1.1083E−05 |
| A14 | 9.3781E−07 |

Optical path difference function (HD DVD: Fourth order
DVD: Third order Blaze wavelength 410 nm)

| | |
|---|---|
| B2 | −2.7101E−03 |
| B4 | −1.8581E−04 |
| B6 | −4.0646E−06 |
| B8 | −4.3907E−06 |
| B10 | 3.6580E−07 |

Third surface
Aspheric surface coefficient

| | |
|---|---|
| κ | 5.0000E+00 |
| A4 | 1.5116E−02 |
| A6 | −2.4896E−03 |
| A8 | −9.4311E−05 |
| A10 | 1.2912E−04 |
| A12 | −2.2230E−05 |
| A14 | 1.3298E−06 |

As shown in Table 6, the objective lens of the present example is an objective lens with compatibility for HD and DVD, and focal length f1 is set to 3.10 mm, magnification m1 is set to −1/256.4 and NA1 is set to 0.65 for wavelength λ1 of 407 nm, and focal length f2 is set to 3.15 mm, magnification m2 is set to 1/192.3 and NA2 is set to 0.65 for wavelength λ2 of 655 nm.

In Example 6, when wavefront aberration under the standard condition of HD is 0.000 λrms, wavefront aberration in the case of wavelength fluctuation (−5 nm) accompanied by no ambient temperature change is 0.014 λrms, wavefront aberration in the case of wavelength fluctuation (+1.5 nm, +30° C.) accompanied by ambient temperature change is 0.057 λrms, and wavefront aberration generated when the first light flux enters as a gently divergent light in the case of tracking of the objective lens (in the case of moving by 0.3 mm in the direction perpendicular to the optical axis) is 0.000 λrms.

Thus, the foregoing confirmed that the objective lens of the present example has excellent wavelength characteristics, temperature characteristics and tracking characteristics.

Example 7

Table 7 shows lens data (optical system including objective lens and collimating lens) of Example 7.

TABLE 7

Example 7 Lens data

| | | | | | | |
|---|---|---|---|---|---|---|
| Focal length of objective lens | | $f_1$ = 2.4 mm | | $f_2$ = 2.45 mm | | $f_3$ = 2.50 mm |
| Numerical aperture on the image surface side | | NA1: 0.65 | | NA2: 0.65 | | NA3: 0.45 |
| Magnification of objective lens | | m1: 0 | | m2: −1/13.1 | | m3: −1/13.0 |

| i-th surface | ri | di (407 nm) | ni (407 nm) | di (655 nm) | ni (655 nm) | di (785 nm) | ni (785 nm) |
|---|---|---|---|---|---|---|---|
| 0 | | 14.15 | | 827.00 | | 36.16 | |
| 1 | 37.65302 | 1.50 | 1.542771 | | | | |
| 2 | −3.06488 | 5.00 | 1.00 | | | | |
| 3 (Aperture diameter) | ∞ | 0.1 (φ3.120 mm) | | 0.1 (φ3.198 mm) | | 0.1 (φ2.403 mm) | |
| 4 | 1.92291 | 1.60 | 1.524609 | 1.60 | 1.506732 | 1.60 | 1.503453 |
| 5 | −19.08099 | 1.02 | 1.0 | 1.06 | 1.0 | 0.89 | 1.0 |
| 6 | ∞ | 0.60 | 1.61869 | 0.60 | 1.57752 | 1.20 | 1.57063 |
| 7 | ∞ | | | | | | |

* The symbol di shows a displacement from the i-th surface to (i + 1)th surface

Aspheric surface data

First surface (for HD-DVD only)
Aspheric surface coefficient

| | |
|---|---|
| κ | −2.0527 × E−1 |
| A4 | +1.2177 × E−2 |
| A6 | −1.4618 × E−4 |

Second surface (for HD-DVD only)
Aspheric surface coefficient

| | |
|---|---|
| κ | −1.0874 × E−1 |
| A4 | +9.5823 × E−3 |
| A6 | +7.0554 × E−4 |

Optical path difference function
(HD DVD: First order Blaze wavelength 1 mm)

| | |
|---|---|
| B2 | +1.4605 × E+2 |
| B4 | +5.9202 × E−0 |
| B6 | +3.1566 × E−0 |

Fourth surface
Aspheric surface coefficient

| | |
|---|---|
| κ | −7.9792 × E−1 |
| A4 | +4.9330 × E−3 |
| A6 | +7.0747 × E−4 |
| A8 | +9.4490 × E−4 |
| A10 | −1.0691 × E−3 |
| A12 | +4.1435 × E−4 |
| A14 | −7.3960 × E−5 |

Optical path difference function
(HD DVD: Second order DVD: First order
CD: First order Blaze wavelength 1 mm)

| | |
|---|---|
| B2 | −1.9643 × E+1 |
| B4 | −1.5085 × E−0 |
| B6 | +1.0855 × E−1 |
| B8 | −1.0371 × E−1 |
| B10 | +1.3735 × E−2 |

Fifth surface
Aspheric surface coefficient

| | |
|---|---|
| κ | −5.2563 × E+2 |
| A4 | +1.7853 × E−2 |
| A6 | −4.7662 × E−3 |

TABLE 7-continued

| A8  | −4.9002 × E−3 |
| A10 | +4.0691 × E−3 |
| A12 | −1.9875 × E−3 |
| A14 | +3.9475 × E−4 |

As shown in Table 7, the objective lens of the present example is an objective lens with compatibility for HD, DVD and CD, and focal length f1 is set to 2.4 mm, magnification m1 is set to 0 and NA1 is set to 0.65 for wavelength λ1 of 407 nm, and focal length f2 is set to 2.45 mm, magnification m2 is set to −1/13.1 and NA2 is set to 0.65 for wavelength λ2 of 655 nm, and focal length f3 is set to 2.50 mm, magnification m3 is set to −1/13.0 and NA3 is set to 0.45 for wavelength λ2 of 785 nm.

There is formed diffractive structure DOE on each of the second and fourth surfaces in the optical system shown in Table 7. The diffractive structure DOE is represented by an optical path difference which is added to a wavefront of a transmitted light flux by the structure. This optical path difference is expressed by optical path difference function φ (h) (mm) that is defined by substituting coefficients in Table 7 for the above Numeral 1.

In the optical system in Table 7, the number of diffractive ring-shaped zones (primary diffraction) for objective lens common area N1 is 81, number of ring-shaped zones for collimating lens (primary diffraction) N2 is 1, and Magnification of optical system on the part of the first optical disc m is −1/6.

In Example 7, at the best image surface position under the standard condition of HD, an amount of changes in wavefront aberration in the case of wavelength fluctuation (+1 nm) accompanied by no ambient temperature change is 0.008 λrms, an amount of changes in wavefront aberration in the case of wavelength fluctuation (+10 nm) accompanied by no ambient temperature change is 0.038 λrms, and amount of changes in wavefront aberration in the case of ambient temperature change (+30° C.) is 0.023 λrms. At the best image surface position under the standard condition of DVD, an amount of changes in wavefront aberration in the case of wavelength fluctuation (+1 nm) accompanied by no ambient temperature change is 0.022 λrms, an amount of changes in wavefront aberration in the case of wavelength fluctuation (+10 nm) accompanied by no ambient temperature change is 0.050 λrms, amount of changes in wavefront aberration in the case of ambient temperature change (+30° C.) is 0.045 λrms.

Thus, the foregoing confirmed that the objective lens of the present examples have excellent wavelength characteristics and temperature characteristics.

The invention makes it possible to obtain an objective lens that is used for reproducing and/or recording of information for at least two types of optical discs including a high density optical disc, and has excellent wavelength characteristics, temperature characteristics and tracking characteristics, and to obtain an optical pickup apparatus employing the aforesaid objective lens.

What is claimed is:

1. An objective lens for use in an optical pickup apparatus at least reproducing and/or recording information using a light flux with a wavelength λ1 emitted by a first light source for a first optical disc having a protective substrate with a thickness t1 and reproducing and/or recording information using a light flux with a wavelength λ2 (1.5×λ1≦λ2≦1.7× λ1) emitted by a second light source for a second optical disc having, a protective substrate with a thickness t2 (0.8×t1≦t2), the objective lens comprising:

a diffractive structure formed on at least one optical surface of the objective lens, wherein each of the light flux with the wavelength λ1 and the light flux with the wavelength λ2 enters the objective lens, an optical system magnification m1 of the objective lens for the light flux with a wavelength λ1 and an optical system magnification m2 of the objective lens for the light flux with a wavelength λ2 have different signs and values from each other, and the diffractive structure has a positive diffractive action.

2. The objective lens of claim 1, wherein the diffractive structure is defined by using an optical path difference function φ(h):

$$\phi(h)=C_2 \times h^2 + C_4 \times h^4 + \ldots + C_{2i} \times h^{2i}$$

and satisfies $C_4 < 0$ where h is a height from an optical axis, $C_{2i}$ is a coefficient of the optical path difference function, and i is a natural number.

3. The objective lens of claim 2 satisfying $-1.0 \times 10^{-3} < C_4 < -1.0 \times 10^{-4}$.

4. The objective lens of claim 3 satisfying $-7.0 \times 10^{-4} < C_4 < -4.5 \times 10^{-4}$.

5. The objective lens of claim 3, wherein the diffractive structure is a diffractive structure formed of a plurality of concentric ring-shaped zones around the optical axis, a cross section of the diffractive structure including the optical axis has a serrated shape, and a distance d of a step of each of the plurality of ring-shaped zones along an optical axis satisfies $$(2N-1) \times \lambda 1/(n1-1) \leq d < 2N \times \lambda 1/(n1-1),$$

where n1 is a refractive index of the objective lens for a light flux with the wavelength λ1, and N is a natural number.

6. The objective lens of claim 5, wherein N is 2.

7. The objective lens of claim 1, wherein a wavefront aberration change amount ΔW [λrms] generated when a wavelength of the light flux with the wavelength λ1 changes +5 nm, satisfies ΔW≦0.05.

8. The objective lens of claim 1, wherein at least one of the optical system magnification m1 and the optical system magnification m2 is larger than 0 and is not more than 1/100.

9. The objective lens of claim 1, wherein a diffractive power of the diffractive structure is negative.

10. The objective lens of claim 9, wherein a change amount of a position where a wavefront aberration is minimum dfb/dλ of the objective lens along an optical axis per 1 nm of a wavelength change for the light flux with the wavelength λ1 satisfies $|dfb/d\lambda| \leq 0.1 \; [\mu m/nm]$, where fb is a distance from the objective lens to the first optical disc.

11. The objective lens of claim 9,
wherein a change amount of a position where a wavefront aberration is minimum dfb/dλ of the objective lens along an optical axis per 1 nm of a wavelength change for the light flux with the wavelength λ2 satisfies $|dfb/d\lambda| \leq 0.1 \; [\mu m/nm]$, where fb is a distance from the objective lens to the second optical disc.

12. The objective lens of claim 1, satisfying t1=t2.

13. The objective lens of claim 1, satisfying NA1=NA2, when NA1 is an numerical aperture of an emergence side of the objective lens for the light flux with the wavelength λ1, and NA2 is an numerical aperture of an emergence side of the objective lens for the light flux with the wavelength λ2.

14. The objective lens of claim 1,
wherein the first light source and the second light source are provided as separated bodies.

15. The objective lens of claim 14,
wherein each of the first light source and the second light source is provided on an optical axis.

16. The objective lens of claim 1,
wherein a chromatic aberration correcting element having a function of correcting a chromatic aberration of a passing light flux, is provided on at least one of optical paths of the light fluxes with the wavelength λ1 and the wavelength λ2.

17. The objective lens of claim 16,
wherein the chromatic aberration correcting element is a collimating lens.

18. The objective lens of claim 1,
wherein the objective lens is further used for an optical pickup apparatus reproducing and/or recording information using a light flux with a wavelength λ3 (1.8× λ1≦λ3≦2.2×λ1) emitted by a third light source for a third optical disc having a protective substrate with a thickness t3 (t2<t3), and
each of the light fluxes with the wavelength λ1, the wavelength λ2 and the wavelength λ3 enters into the objective lens.

19. The objective lens of claim 18,
wherein an aperture limiting element is arranged on an optical path of the light flux with the wavelength λ3.

20. The objective lens of claim 18,
wherein an optical system magnification m3 of the objective lens for the light flux with the wavelength λ3 satisfies $-1/10 \leq m3 \leq -1/100$.

21. The objective lens of claim 18,
wherein the first light source, the second light source and the third light source are provided as separated bodies.

22. The objective lens of claim 21,
wherein each of the first light source, the second light source and the third light source is provided on an optical axis.

23. The objective lens of claim 18,
wherein a chromatic aberration correcting element having a function of correcting a chromatic aberration of a passing light flux, is provided on at least one of optical paths of the light fluxes with the wavelength λ1, the wavelength λ2 and the wavelength λ3.

24. The objective lens of claim 23,
wherein the chromatic aberration correcting element is a collimating lens.

25. The objective lens of claim 1,
wherein a focal length f1 of the objective lens for the light flux with the wavelength λ1 satisfies 0.8 mm≦f1≦4.0 mm.

26. The objective lens of claim 1,
wherein the objective lens is made of plastic.

27. The objective lens of claim 26,
wherein the plastic is a resin composition comprising:
a polymer having an ethylenically unsaturated monomer unit containing an alicyclic group; and
an antioxidant having a phosphoric ester structure and a phenol structure in a molecule.

28. The objective lens of claim 26,
wherein the plastic is a resin composition comprising:
a polymer having an ethylenically unsaturated monomer unit containing an alicyclic group; and
an antioxidant represented by a general formula (1),
where, in the general formula (1), R19 through R24 each independently represent a hydrogen atom, an alkyl group having 1 to 8 carbon atoms, a cycloalkyl group having 5 to 8 carbon atoms, an alkyl cycloalkyl group having 6 to 12 carbon atoms, or an aralkyl group or a phenyl group having 7 to 12 carbon atoms,
R25 through R26 each independently represent a hydrogen atom or an alkyl group having 1 to 8 carbon atoms,
X represents a single bond, a sulfur atom, or a —CHR27- group,
R27 represents a hydrogen atom, an alkyl group having 1 to 8 carbon atoms, or a cycloalkyl group having 5 to 8 carbon atoms,
A represents an alkylene group having 2 to 8 carbon atoms, or a *—COR28-group,
R28 represents single bond or an alkylene group having 1 to 8 carbon atoms and * represents that it is bonded to the oxygen atom,
one of Y and Z represents a hydroxyl group, an alkoxy group having 1 to 8 carbon atoms, or an aralkyl oxygroup having 7 to 12 carbon atoms, and,
the other represents a hydrogen atom or an alkyl group having 1 to 8 carbon atoms

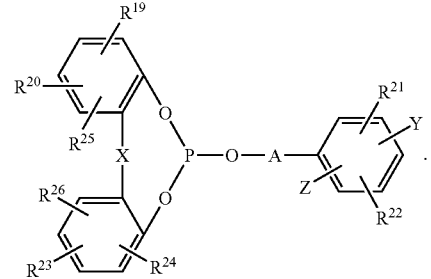

Formula (1)

29. An optical pickup apparatus for at least reproducing and/or recording information for a first optical disc having a protective substrate with a thickness t1 and reproducing and/ or recording information for a second optical disc having a protective substrate with a thickness t2 (0.8×t1≦t2), the optical pickup apparatus comprising:

a first light source for emitting a light flux with a wavelength λ1 for reproducing and/or recording information for the first optical disc;

a second light source for emitting a light flux with a wavelength λ2 ($1.5 \times \lambda 1 \leq \lambda 2 \leq 1.7 \times \lambda 1$) for reproducing and/or recording information for the second optical disc; and the objective lens of claim 1 for converging the light flux with the wavelength λ1 and the light flux with the wavelength λ2 respectively on information recording surfaces of the first disc and the second disc, respectively.

* * * * *